United States Patent [19]

Tanaka et al.

[11] Patent Number: 5,715,075
[45] Date of Patent: Feb. 3, 1998

[54] OPTICAL PROCESSING DEVICE OPERATING IN A WAVELENGTH-SYNCHRONIZED MODE AND AN OPTICAL CIRCUIT EXCHANGER THAT USES SUCH AN OPTICAL PROCESSING DEVICE

[75] Inventors: Kazuhiro Tanaka; Kiyohide Wakao; Hiroyuki Nobuhara; Nobuhiro Fujimoto; Hiroyuki Rokugawa; Satoshi Kuroyanagi, all of Kawasaki, Japan

[73] Assignee: Fujitsu Limited, Kawasaki, Japan

[21] Appl. No.: 293,598

[22] Filed: Aug. 22, 1994

Related U.S. Application Data

[62] Division of Ser. No. 167,122, Dec. 16, 1993, abandoned, which is a continuation of Ser. No. 819,212, Jan. 10, 1992, abandoned.

[30] Foreign Application Priority Data

Jan. 10, 1991 [JP] Japan ................................ 3-12373
Feb. 8, 1991 [JP] Japan ................................ 3-37850

[51] Int. Cl.$^6$ .................................................. H04J 14/02
[52] U.S. Cl. .................................................. 359/128
[58] Field of Search ................................ 359/123, 117, 359/124, 126-128

[56] References Cited

U.S. PATENT DOCUMENTS

| | | | |
|---|---|---|---|
| 4,742,576 | 5/1988 | McMahon | 359/126 |
| 4,845,703 | 7/1989 | Suzuki | 359/128 |
| 4,989,199 | 1/1991 | Rzeszewski | 359/123 |
| 5,005,166 | 4/1991 | Suzuki | 359/123 |
| 5,099,347 | 3/1992 | Daniele | 359/123 |

FOREIGN PATENT DOCUMENTS

| | | |
|---|---|---|
| 0 223 258 | 5/1987 | European Pat. Off. |
| 0 249 112 | 12/1987 | European Pat. Off. |
| 2250394 | 6/1992 | United Kingdom ................ 359/123 |

OTHER PUBLICATIONS

*Patent Abstracts of Japan*, vol. 8, No. 39 (E-228)[1476] Feb. 21, 1984 & JP-A-58 196796 (Nippon Denki K.K.) Nov. 16, 1983.

Chraplyvy et al., "Narrowband Tunable Optical Filter for Channel Selection in Densely Packed WDM Systems," *Electronics Letters*, vol. 22, No. 20, Sep. 25, 1986, pp. 1084–1085.

*Patent Abstracts of Japan*, vol. 11, No. 240 (E-529)[2687] Aug. 6, 1987 & JP-A-62 251895 (NEC Corp.) Mar. 6, 1987.

Smith et al., "Optical Processing in Future Coherent Networks," *Conference Record, IEEE/IEICE Global Telecommunications Conference* 1987, vol. 1, Nov. 15–18, 1987, pp. 678–683.

Hinton, H. Scott, "Architectural Considerations for Photonic Switching Networks," *IEEE Journal on Selected Areas in Communications*, vol. 6, No. 7, Aug. 1988, pp. 1209–1226 (XP 000068606).

(List continued on next page.)

*Primary Examiner*—Leslie Pascal
*Attorney, Agent, or Firm*—Staas & Halsey

[57] ABSTRACT

An optical processing device for converting a wavelength of an optical signal comprises an optical processing unit supplied with an input optical beam carrying thereon one or more optical signals with respective wavelengths that are different from each other, the optical processing means being further supplied with a control optical beam having a stabilized reference wavelength and selecting the optical signal that has a first wavelength and outputting the same with a second wavelength that is specified by the reference wavelength; and a control unit for controlling the optical processing unit by specifying the first wavelength of the optical beam to be selected.

9 Claims, 18 Drawing Sheets

OTHER PUBLICATIONS

Kawaguchi et al., "Tunable Optical–Wavelength Conversion Using an Optically Triggerable Multielectrode Distributed Feedback Laser Diode," *IEEE Journal of Quantum Electronics*, vol. 24, No. 11, Nov. 1988, pp. 2153–2159 (XP 000105699).

Oda et al., "Channel Selection and Stabilization Technique for a Waveguide–Type 16–Channel Frequency Selection Switch for Optical FDM Distribution Systems," *IEEE Photonics Technology Letters*, vol. 1, No. 6, Jun. 1989, pp. 137–139.

Linke, R.A., "Frequency Division Multiplexed Optical Networks Using Heterodyne Detection," *IEEE Network: The Magazine of Computer Communications*, vol. 3, No. 2, Mar. 1989, New York, NY, pp. 13–20 (XP26492).

Suzuki et al., "A Photonic Wavelength–Division Switching System Using Tunable Laser Diode Filters," *IEEE International Conference on Communications*, Conference Record, vol. 2 of 3, Jun. 11–14, 1989, Boston, MA, pp. 722–727 (XP75238).

Fujiwara et al., "Photonic Switching Systems Using Coherent Optical Transmission Technologies," *Proceedings of the Fourth Tirrenia International Workshop on Digital Communications: Coherent Optical Communications and Photonic Switching*, Sep. 19–23, 1989, pp. 349–364 (XP 0001640007).

*Patent Abstracts of Japan*, vol. 13, No. 463 (E–833)[3811] Oct. 19, 1989 & JP–A–01 181294 (Fujitsu Ltd.) Jul. 19, 1989.

Fujiwara et al., "A Coherent Photonic Wavelength–Division Switching System for Broad–Band Networks," *Journal of Lightwave Technology*, vol. 8, No. 3, Mar. 1990, New York, NY, pp. 416–422 (XP136396).

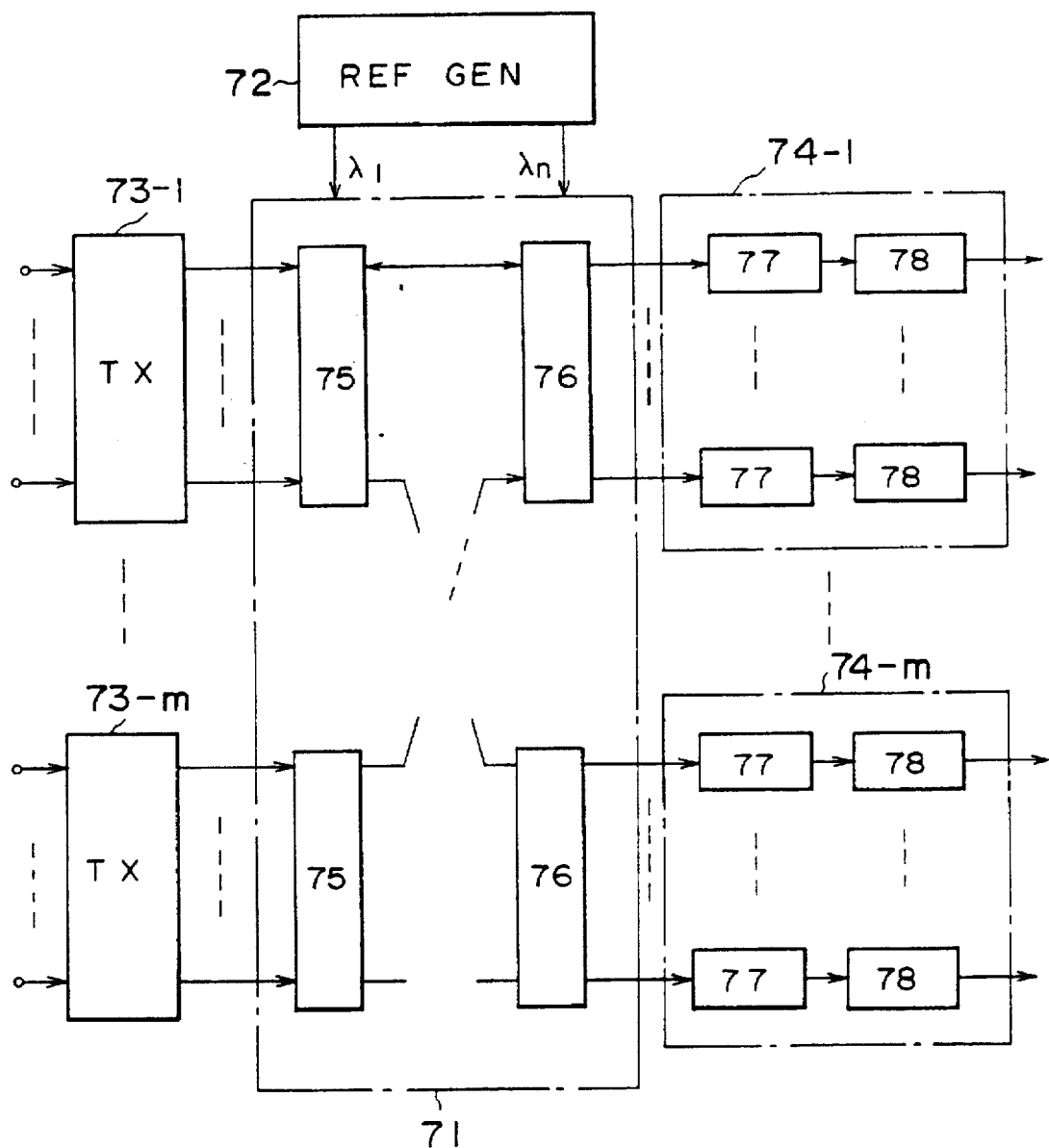

OPTICAL PROCESSING DEVICE OPERATING IN A WAVELENGTH-SYNCHRONIZED MODE AND AN OPTICAL CIRCUIT EXCHANGER THAT USES SUCH AN OPTICAL PROCESSING DEVICE

This application is a division of application Ser. No. 08/167,122, filed Dec. 16, 1993, now abandoned, which was a continuation of application Ser. No. 07/819,212, filed Jan. 10, 1992, now abandoned.

BACKGROUND OF THE INVENTION

The present invention generally relates to optical processing systems and more particularly to a wavelength-synchronized optical processing device that produces an optical signal having a wavelength that is synchronized to a stabilized wavelength of a reference optical beam and various optical information processing systems that use such an optical processing device.

With the extensive deployment of optical telecommunication networks, studies are made on the optical transmission and reception in the optical exchange systems and optical subscriber systems. Among others, there is a proposal to transmit a plurality of optical signals having different wavelengths on a common optical fiber or optical waveguide in the wavelength multiplex mode. In such a wavelength multiplex transmission of optical signals, it is necessary to superpose (i.e., multiplex) the optical signals with sufficient wavelength interval such that a reception side can demultiplex the received optical signal into individual optical signal components with reliability. In such wavelength multiplex systems, it will be easily understood that the change or fluctuation of the oscillation wavelength occurring in the optical signals causes a disastrous effect in the operation of the reception side systems.

FIG. 1 shows the block diagram of a conventional optical processing system that uses a wavelength converter 1a.

Referring to FIG. 1, the wavelength converter 1a is supplied with an input optical signal having a wavelength of $\lambda_0$ and produces an output optical signal with a wavelength of $\lambda_1$. There, the wavelength converter converts the wavelength of the input optical signal to a second wavelength, and the optical signal having the wavelength $\lambda_1$ is divided out from the converted optical signal in response to a reference optical beam, supplied given externally, having the wavelength $\lambda_1$.

More specifically, the output optical signal of the wavelength converter 1a is supplied to an optical divider 2a that divides the incident optical beam into a first output beam corresponding to the output optical signal and a second output beam, and the second output beam is supplied to a wavelength comparator 3a. The wavelength comparator 3a is further supplied with the reference optical beam and produces an electric output indicative of the difference between the wavelength of the output optical signal of the converter 1a and the wavelength $\lambda_1$ of the reference optical beam.

The output electric signal of the comparator 3a is supplied to a controller 4a that in turn produces a control signal for controlling the operation of the wavelength converter 1a. According to this system, one can convert the wavelength $\lambda_0$ of the incident optical signal to the wavelength $\lambda_1$ by controlling the converter 1a such that the output of the wavelength comparator 3a becomes zero. The wavelength converter 1a may be formed by using a DFB laser diode that can change the oscillation wavelength thereof by controlling the bias current or temperature.

FIG. 2 shows another conventional wavelength conversion system wherein an input optical signal having a wavelength $\lambda_0$ is supplied to a photoelectric converter 1b that produces an electric output in response to the incident optical signal. The output electric signal is supplied to a clock extraction circuit 2b wherein a clock signal is extracted from the information that is modulated on the input optical signal. The clock extraction circuit further discriminates the logic level of the binary information signal modulated on the input optical beam with a timing given by the clocks, and drives an optical modulator 3b. The optical modulator 3b is thereby supplied with a reference optical beam with the wavelength $\lambda_1$ and modulates the same in accordance with the electric output of the clock extraction circuit 2b. As a result, an optical output signal is obtained with the wavelength $\lambda_1$.

In any of these conventional optical processing systems, there has been a problem in that the normal operation of the system is not achieved when there is a fluctuation in the wavelength of the input optical beam. It should be noted that, in the telecommunication systems, there is no guarantee that the transmission side uses the stabilized optical source with respect to the oscillation wavelength. Further, such a fluctuation of the wavelength of the optical signal may be caused as a result of the dispersion of optical pulses that occur in the optical fibers. Thus, the optical transmission system is not only required to eliminate the fluctuation of the wavelength of the optical source at the transmission side but is also required to have an ability to adapt to the fluctuation of wavelength and to eliminate the same at the reception side or at any intermediate locations between the transmission side and the reception side.

SUMMARY OF THE INVENTION

Accordingly, it is a general object of the present invention to provide a novel and useful wavelength-synchronized optical processing device, wherein the foregoing problems are eliminated.

Another and more specific object of the present invention is to provide a wavelength-synchronized optical processing device for use in an optical transmission system wherein the optical processing device is capable of eliminating the fluctuation of wavelength from an optical beam that is transmitted through the optical transmission system.

Another object of the present invention is to provide a wavelength-synchronized optical processing device comprising an optical processing unit supplied with an input optical beam carrying thereon one or more optical signals having respective, mutually different wavelengths, for producing an output optical signal with a wavelength specified by the wavelength of a reference optical beam that is supplied to the optical processing unit externally, and a controller for controlling the operation of the optical processing unit. According to the present invention, one can select any optical signal component of the desired wavelength from the optical signals modulated on the input optical beam within the wavelength-multiplexed mode. Thereby, the wavelength of the input optical signal is synchronized to the stabilized wavelength of the reference optical beam and one can obtain the output optical signals with of an accurate wavelength even when there is a substantial fluctuation in the wavelength of the incident optical signals.

In a preferred embodiment, the optical processing unit comprises a variable wavelength filter supplied with the input optical signal and controlled by the controller for selectively passing the optical signal having the wavelength specified by the wavelength of the reference optical beam, a photoelectric converter supplied with an optical output of the variable wavelength filter for converting the same to an electric signal, and an optical modulator supplied with the output electric signal of the photoelectric converter for modulating an optical beam having the wavelength of the reference optical beam in response to the electric signal. According to the present invention, one can extract a desired optical beam having a wavelength that is synchronized to the reference wavelength from the wavelength-multiplexed input optical beam. The optical processing unit may further include a wavelength converter for converting the wavelength of the output optical beam to a desired wavelength. Thereby, one can reestablish the wavelength multiplexed optical signals with the interval of the wavelength set stably.

Another object of the present invention is to provide an optical switching system comprising an electro-optic converter supplied with input electric signals of different channels for producing optical signals in correspondence to the input electric signals with respective, mutually different wavelengths, an optical distribution unit supplied with the output optical signals from the electro-optic converter for merging and distributing the optical signals into a plurality of physically separated optical channels, and a wavelength-synchronized optical processing device provided on each of the optical channels for producing a stabilized optical output that has a wavelength stabilized with respect to the wavelength of a reference optical beam, and a reference beam generator for producing the reference optical beam with a stabilized wavelength. According to the present invention, one can direct the information signal to any desired optical channels by merging the optical signals at the optical distribution unit and recovering the original information therefrom at the wavelength-synchronized optical processing device by selecting the wavelength of the reference optical beam produced by the reference beam generator. Thereby, the exchange of signals between a huge number of channels is achieved with a simple construction of the switching system.

In a preferred embodiment of the present invention, the optical channels are grouped into a plurality of channel groups each including a plurality of channels, and the reference beam generator supplies the reference optical beam to the plurality of channel groups commonly such that the wavelength of the reference beam is changed in each channel in one channel group.

Another object of the present invention is to provide an optical switching system comprising a plurality of input-side optical channels for guiding wavelength-multiplexed optical signals therethrough, a plurality of output-side channels for guiding output optical signals therethrough, each of said input-side optical channels and each of said output-side optical channels being crossed with each other at a node, wherein there is provided a wavelength-synchronized optical processing device in correspondence to each node, said optical processing device comprising: an optical processing unit supplied with said wavelength-multiplexed input optical signal and a reference optical beam having a reference wavelength for transferring selectively an optical signal that has a wavelength specified by the reference wavelength from the optical input channel to the optical output channel; and a reference beam generator for producing the reference optical beam with said reference wavelength. According to the present invention, the transfer of optical signals from the plurality of input-side optical channels to a desired output-side optical channel is achieved while simultaneously stabilizing the wavelength of the output optical beam on the output-side optical channel. Further, a number of optical output signals having different wavelengths are multiplexed on the output-side optical channel at the plurality of nodes, thereby provide a wavelength-multiplexed optical signal with stabilized wavelengths.

In a preferred embodiment, one may provide intermediate optical channels to link the input-side optical channels and the output-side optical channels, with the optical processing unit and the reference beam generator provided at each node between the input-side optical channels and the intermediate optical channels and further at each node between the intermediate optical channels and the output-side optical channels.

Another object of the present invention is to provide a variable-wavelength filter device that is supplied with a control signal having a controlled wavelength for selectively transmitting an incident optical beam that has a wavelength specified by the controlled wavelength.

Other objects and further features of the present invention will become apparent from the following detailed description when read in conjunction with the attached drawings.

BRIEF DESCRIPTION OF THE DRAWINGS

FIG. 21 is a block diagram showing the construction of the optical transmission system according to a thirteenth embodiment of the present invention wherein the wavelength-synchronized optical processing device is used.

DETAILED DESCRIPTION OF THE PREFERRED EMBODIMENTS

Figure 1:
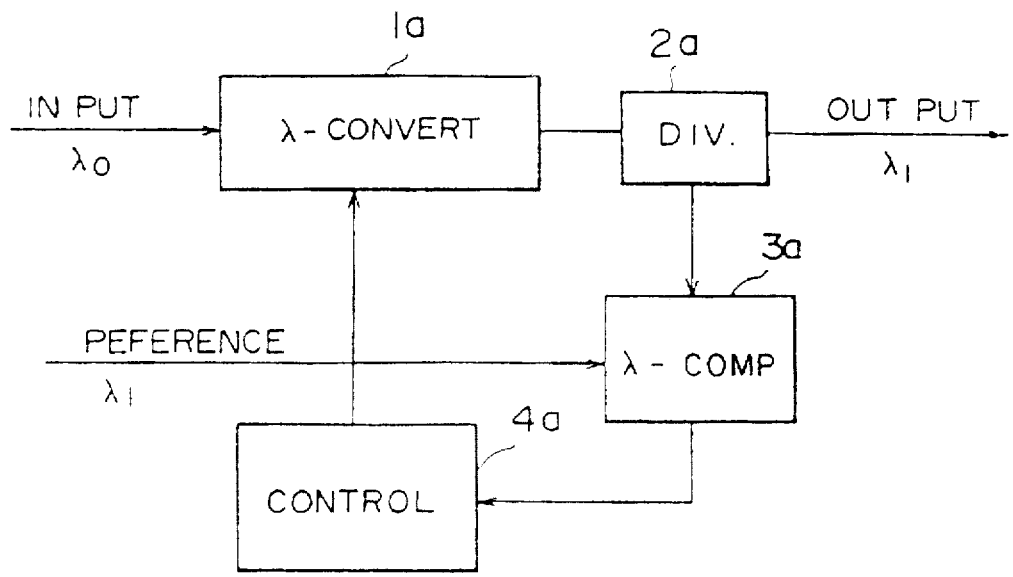
FIG. 1 is a block diagram showing the construction of a conventional wavelength conversion circuit used in an optical transmission system.
Figure 2:
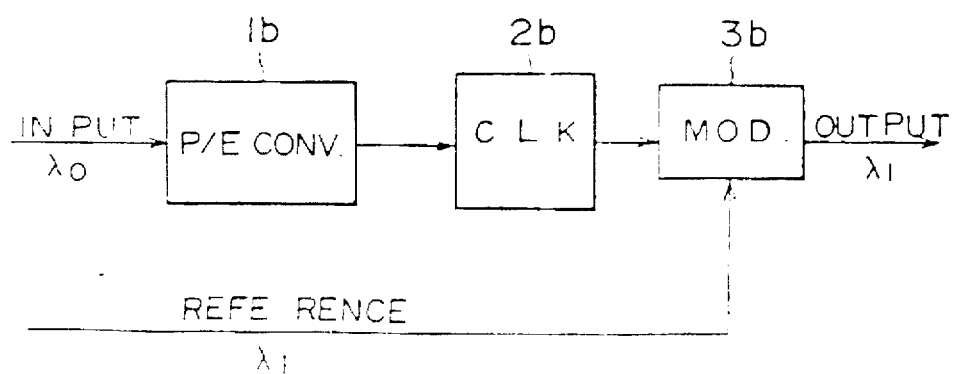
FIG. 2 is a block diagram showing another conventional wavelength conversion circuit.
Figure 3:
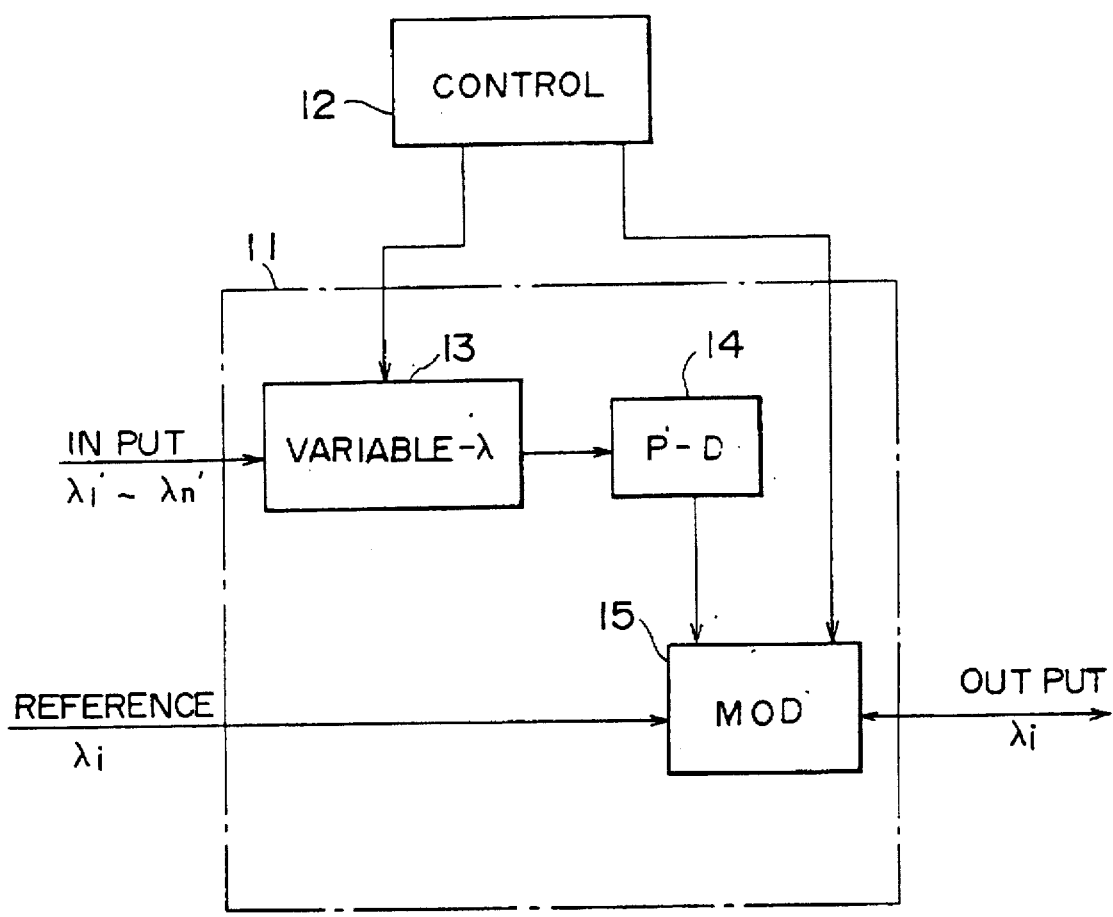
FIG. 3 is a block diagram showing the construction of the wavelength-synchronized optical processing device according to a first embodiment of the present invention.

FIG. 3 shows the general construction of the wavelength-synchronized optical processing device according to a first embodiment of the present invention. The optical processing device of FIG. 3 is an optical demultiplexer that selectively recovers an optical signal component from a wavelength-multiplex optical signal modulated on an input optical beam, in response to a reference optical beam that specifies the wavelength of the optical signal to be recovered.

Referring to FIG. 3, the optical processing device includes an optical processing unit 11 and a control unit 12, wherein the optical processing unit 11 comprises generally, a variable-wavelength band pass filter 13, a photodetector 14 and an optical modulation unit 15. The band pass filter 13 of the optical processing unit 11 is supplied with an incident optical beam and controlled by the control unit 12 such that only the optical signal that has a particular wavelength specified by the control unit 12 is passed through the filter 13.

The output optical beam of the filter 13 is supplied to the photodetector 14 wherein the photodetector 14 converts the optical beam to an electric signal. The output electric signal of the photodetector 14 is supplied to the optical modulation unit 15 and the optical modulation unit 15 modulates the reference optical beam in response to the electric output of the photodetector 14. As will be described later in detail, the filter 13 may be formed of a DFB laser amplifier and changes the wavelength of the optical beam passing therethrough in response to a bias current that is controlled below the threshold of laser oscillation. The optical modulation unit 15 may be a Franz-Keldysh effect device or a laser diode, the gain of which can be changed in response to the output of the photodetector 14.

In operation, an input optical beam that carries thereon optical signals having respective wavelengths $\lambda_1'-\lambda_n'$ in the wavelength-multiplex mode is supplied to the filter 13 that in turn is controlled by the control unit 12 to pass, selectively, the optical signal having the wavelength $\lambda_i'$. Meanwhile, the wavelength of the reference beam is well stabilized by using a stabilized optical source such as a laser diode of which operational temperature and bias current are compensated for with respect to any variation. Thereby, one obtains the output optical signal from the optical modulation unit 15 with the wavelength $\lambda_i$ in correspondence to foregoing original optical signal of the wavelength $\lambda_i'$. The circuit 11 can be formed as an integrated circuit including the control unit 12.

Figure 4:
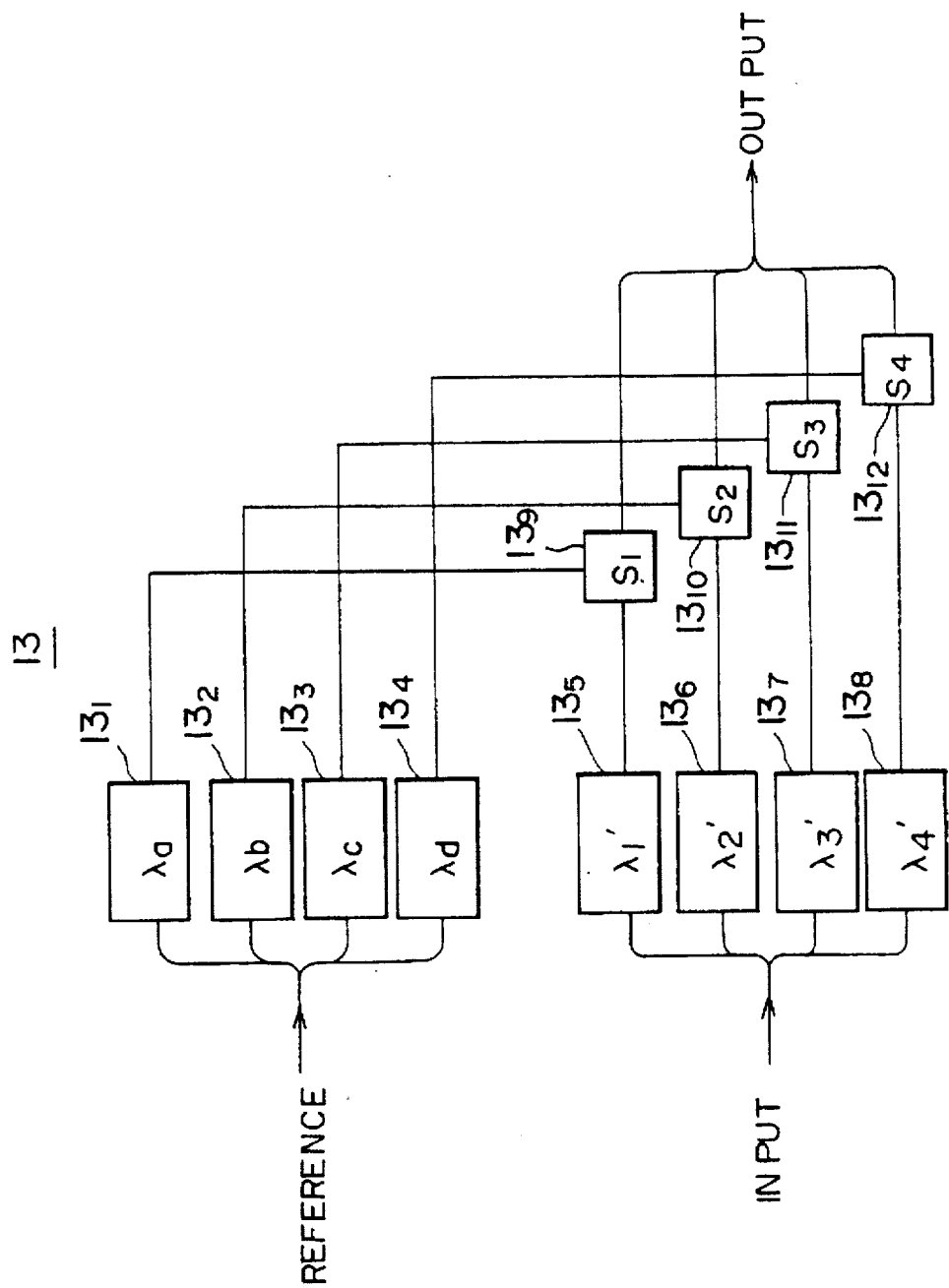
FIG. 4 is a block diagram showing the construction of a variable wavelength filter used in the optical processing device of FIG. 3.

FIG. 4 shows the construction of the filter 13 used in the system of FIG. 3.

Referring to FIG. 4, the filter 13 includes a number of filter elements $13_1-13_4$ respectively passing the optical beams of the wavelengths $\lambda_a-\lambda_d$, as well as a number of filter elements $13_5-13_8$ respectively passing the optical beams of the wavelengths $\lambda_1'-\lambda_4'$, wherein the wavelength-multiplexed input optical beam is supplied to each of the filter elements $13_5-13_8$, in parallel with each other. Further, the reference optical beam is supplied in parallel to each of the filter elements $13_1-13_4$.

The output optical beams of the filter elements $13_5-13_8$, are supplied to corresponding variable transmittance controllers $13_9-13_{12}$ each having a transmittance that is controlled in response to the output of the corresponding filter element. Thus, for the reference optical beam with the wavelength of $\lambda_a$, the transmittance of the controller $13_9$ is selectively increased and the optical signal having the wavelength $\lambda_1'$ is passed through the filter element $13_5$ is and selectively outputted as an output optical beam of the filter 13.

In the present embodiment, one may employ any of the multi-layered dielectric films, optical waveguides, or the spatial filters that use the diffraction grating, for the filter element $13_5-13_9$. Preferably, the wavelengths $\lambda_a$, $\lambda_b$, $\lambda_c$ and $\lambda_d$ may be set coincident to the wavelengths $\lambda_1'$, $\lambda_2'$, $\lambda_3'$ and $\lambda_4'$ such that $\lambda_a=\lambda_1'$, $\lambda_b=\lambda_2'$, $\lambda_c=\lambda_3'$ and $\lambda_d=\lambda_4'$. This, of course, is not the essential requirement for the operation of the device.

Figure 5:
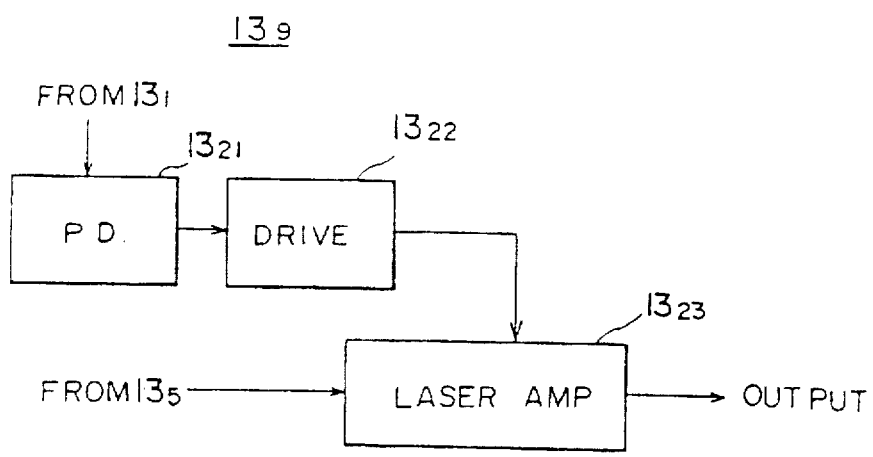
FIG. 5 is a block diagram showing another example of the variable wavelength filter of FIG. 4.

FIG. 5 shows an example of the variable transmittance controllers $13_9-13_{12}$, wherein the input optical signal from one of the filters $13_5-13_9$ is supplied to a laser amplifier $13_{23}$ for amplification by the stimulated emission caused therein in response to the passage of the wavefront of the input optical beam. The operation of the laser amplifier $13_{23}$ is controlled by an electronic control ("DRIVE") circuit $13_{22}$ that in turn is controlled in response to an electric signal produced by a photodetector $13_{21}$ to which the reference optical beam is supplied.

More specifically, the electronic circuit $13_{22}$ produces a bias signal which is supplied to the laser amplifier $13_{23}$ when there is an incident reference optical beam applied to the photodetector $13_{21}$. In response to the bias signal, the laser amplifier $13_{23}$ amplifies the incident input optical signal, while when there is no bias signal, the laser amplifier $13_{23}$ absorbs the input optical signal. For the variable transmittance controllers, one may use, in addition to the foregoing laser amplifier, a Franz-Keldysh effect device or MQW optical modulator that uses the quantum confinement Stark effect.

Figure 6:
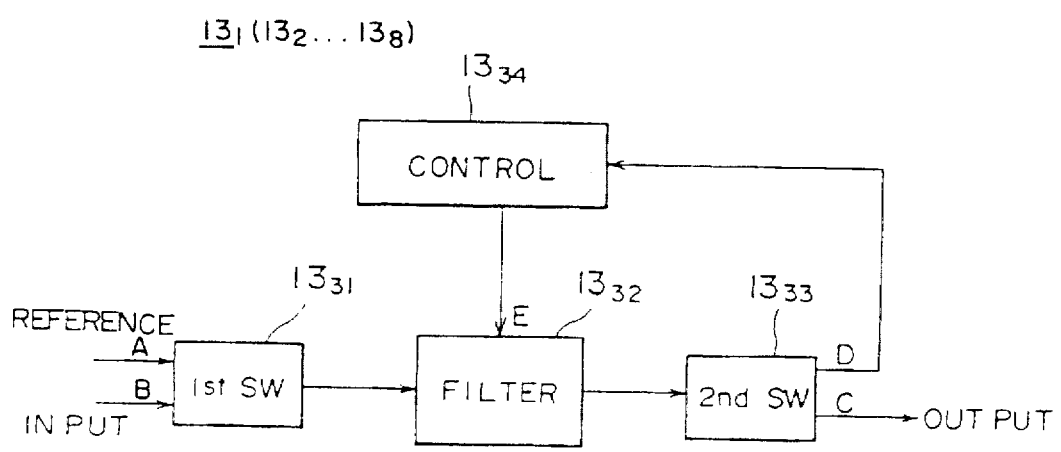
FIG. 6 is a block diagram showing still another construction of the variable wavelength filter of FIG. 4.

FIG. 6 shows an embodiment of a filter element, such as element 13-1 of the plural elements $13_1$ to $13_8$ of the variable-wavelength filter 13 FIG. 4 wherein there is provided an optical switch $13_{31}$ that has a first input port A for receiving the reference optical beam and a second input port B for receiving the input optical beam, wherein one of the optical beams at the input port A and the input port B is supplied selectively by the optical switch $13_{31}$ to a filter device $13_{32}$, the pass 6 and wavelength of which is controlled by a controller $13_{34}$. The optical beam that has passed through the filter device $13_{32}$ is supplied to a second optical switch $13_{33}$ that has a first output port C connected to an output waveguide (not shown) and a second output port D connected to the controller $13_{34}$.

In operation, the first optical switch $13_{31}$ is set at first such that the input port B is selected. Further, the second optical switch $13_{33}$ is set such that the output port D is selected. In this state, the reference optical beam supplied to the input port B is transferred to the controller $13_{34}$ after passing through the filter device $13_{32}$ and the switch $13_{33}$. Thereby, the controller $13_{34}$ sets the state of the filter device $13_{32}$ such that the transmittance of the optical beam becomes a maximum. After such training of the filter device $13_{32}$ is completed, the state of each of the optical switches $13_{31}$ and $13_{33}$ is switched such that the input optical beam at the port A is outputted at the port C after passing through the filter device $13_{32}$. Thereby, only the optical signal that has the wavelength coincident to the wavelength of the filter device $13_{32}$ appears at the output port C. In other words, the filter element 13-1 of the variable-wavelength filter 13 is tuned to a desired wavelength coincident with and delete refer the wavelength of the optical beam supplied to the input port.

Figure 7:
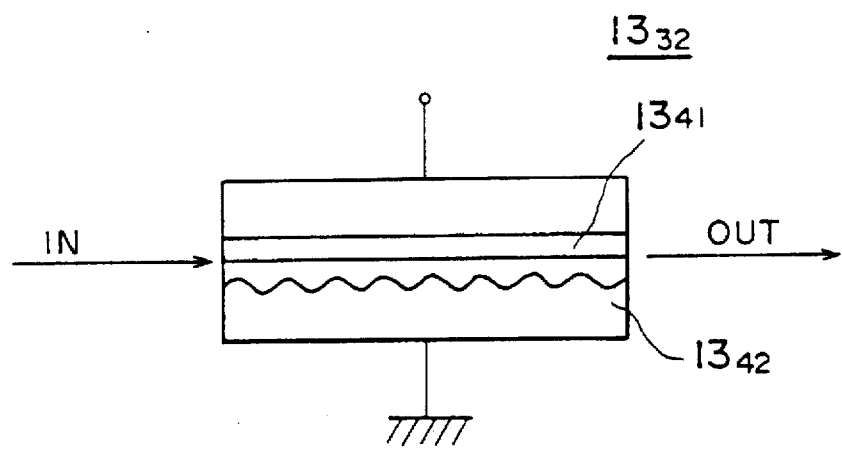
FIG. 7 is a diagram showing the structure of a semiconductor optical device used in the variable wavelength filter of FIG. 6.

FIG. 7 shows the construction of the filter device $13_{32}$.

Referring to FIG. 7, the filter device $13_{32}$ is formed of a DFB laser diode that has an active layer $13_{41}$ and a diffraction grating $13_{42}$. In operation, the device is biased below the threshold of laser oscillation. Thereby, the incident optical beam causes a stimulated emission in the active layer $13_{41}$ upon passage therethrough.

Figure 8:
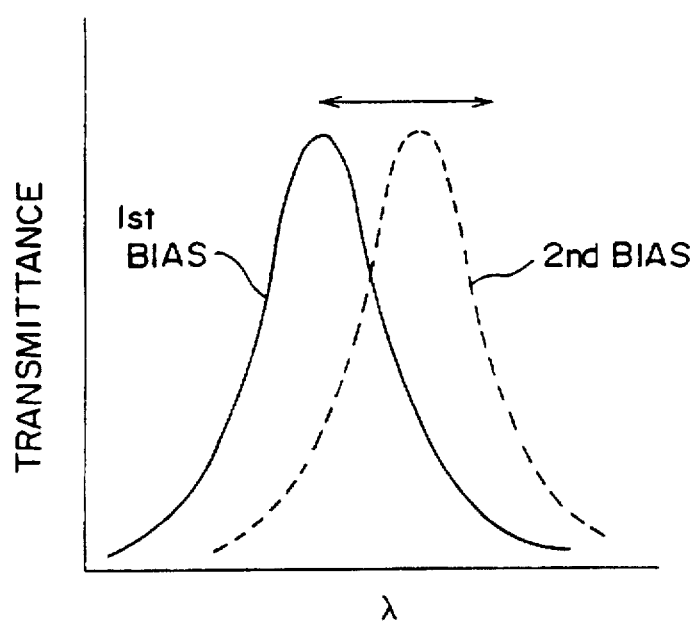
FIG. 8 is a diagram showing the operational characteristics of the device of FIG. 7.

FIG. 8 shows the band-pass characteristics of the laser amplifier of FIG. 7 for different bias voltages. As can be seen in FIG. 8, the peak of the transmittance shifts in response to the bias voltage. By using this effect, one can set the pass-band or pass-wavelength in the filter device by means of the controller $13_{43}$.

According to the construction of FIG. 6, one can maintain stable operational characteristics for the filter 13 as a whole even when there is a change in the operational characteristics of the laser amplifier itself. Obviously, this is due to the feedback control of the laser amplifier $13_{32}$ as described above. For the optical switches $13_{31}$ and $13_{33}$, one may use the directional coupler and saturable optical absorption switch that changes the transmittance in response to the injection of carriers.

Figure 9:
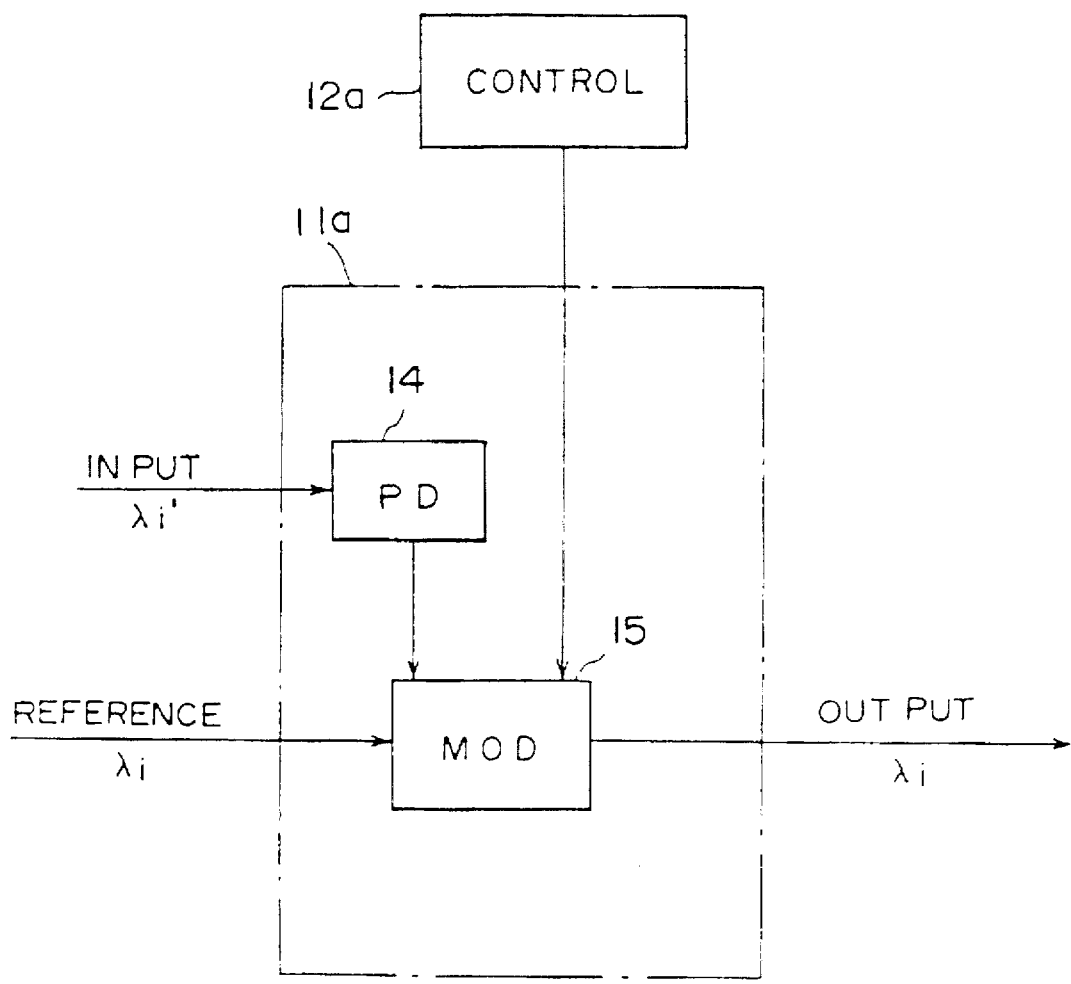
FIG. 9 is a block diagram showing the construction of the wavelength-synchronized optical processing device according to a second embodiment of the present invention.

FIG. 9 shows a wavelength-synchronized optical processing device according to a second embodiment of the present invention.

Referring to FIG. 9, the device includes an optical processing unit and a control unit 12a, wherein the optical processing unit 11a uses the photodetector 14 for detecting the input optical beam that has the wavelength of $\lambda_i'$ similarly to the optical processing unit 11 of the first embodiment. This input optical beam may have the fluctuation in the wavelength $\lambda_i'$.

The output electric signal of the photodetector 14 is supplied to the optical modulator 15 that in turn is supplied with the reference optical beam of the wavelength $\lambda_i$. Thereby, the optical modulator 15 modulates the reference optical beam with the output electric signal of the photodetector 14, and an output optical beam carrying the optical signal of the original wavelength $\lambda_i'$ is obtained with a stabilized wavelength of $\lambda_i$. Further, the control unit 12a is used for controlling the operation of the optical modulator 15.

Figure 10:
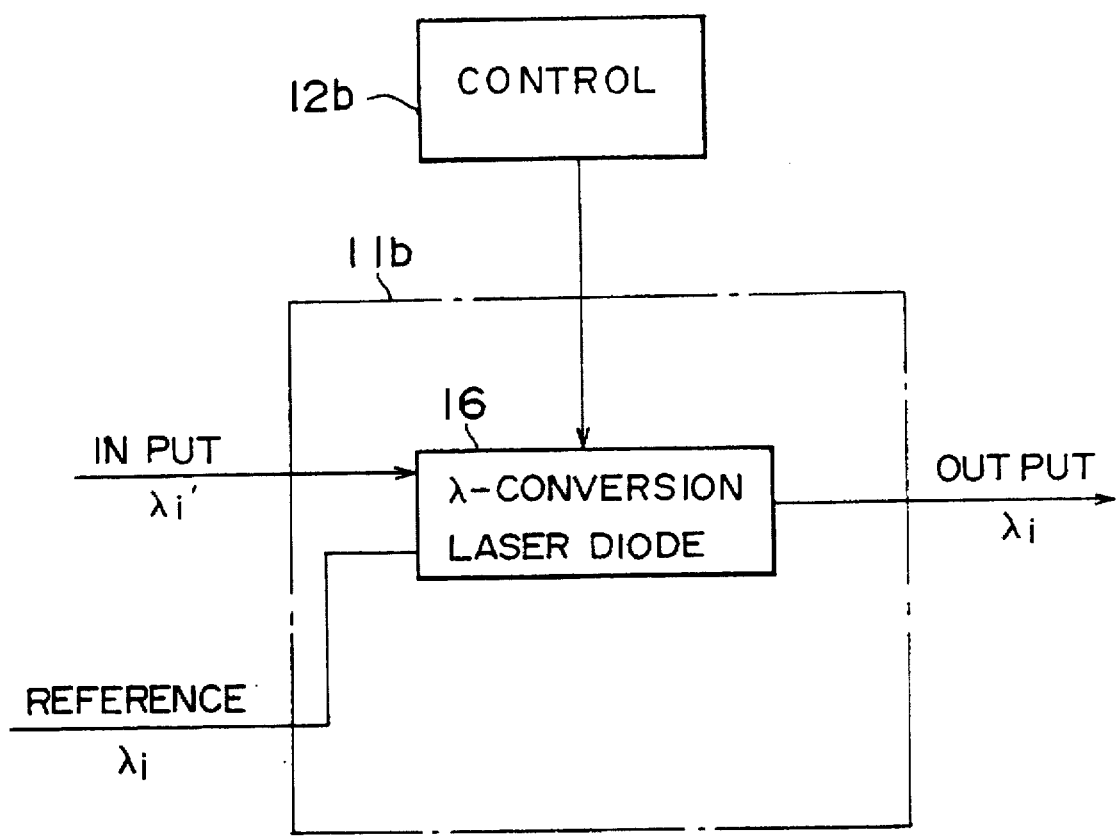
FIG. 10 is a block diagram showing the construction of the wavelength-synchronized optical processing device according to a third embodiment of the present invention.

FIG. 10 shows a wavelength-synchronized optical processing device according to a third embodiment of the present invention.

Referring to FIG. 10, the optical processing device is formed of an optical processing unit 11b and a control unit 12b, wherein there is provided a laser diode 16 that is controlled by the controller 12b. There, the laser diode is injected with the reference optical beam of the stabilized wavelength $\lambda_i$ and further with the input optical beam of the wavelength $\lambda_i'$ for producing an output optical beam carrying thereon the information modulated on the input optical beam, with the wavelength of $\lambda_i$. Thereby, the laser diode acts as the wavelength converter. Again, the optical signal of the wavelength $\lambda_i'$ and containing fluctuations is converted to the optical signal of the wavelength $\lambda_i$ that is free from fluctuation.

Figure 11:
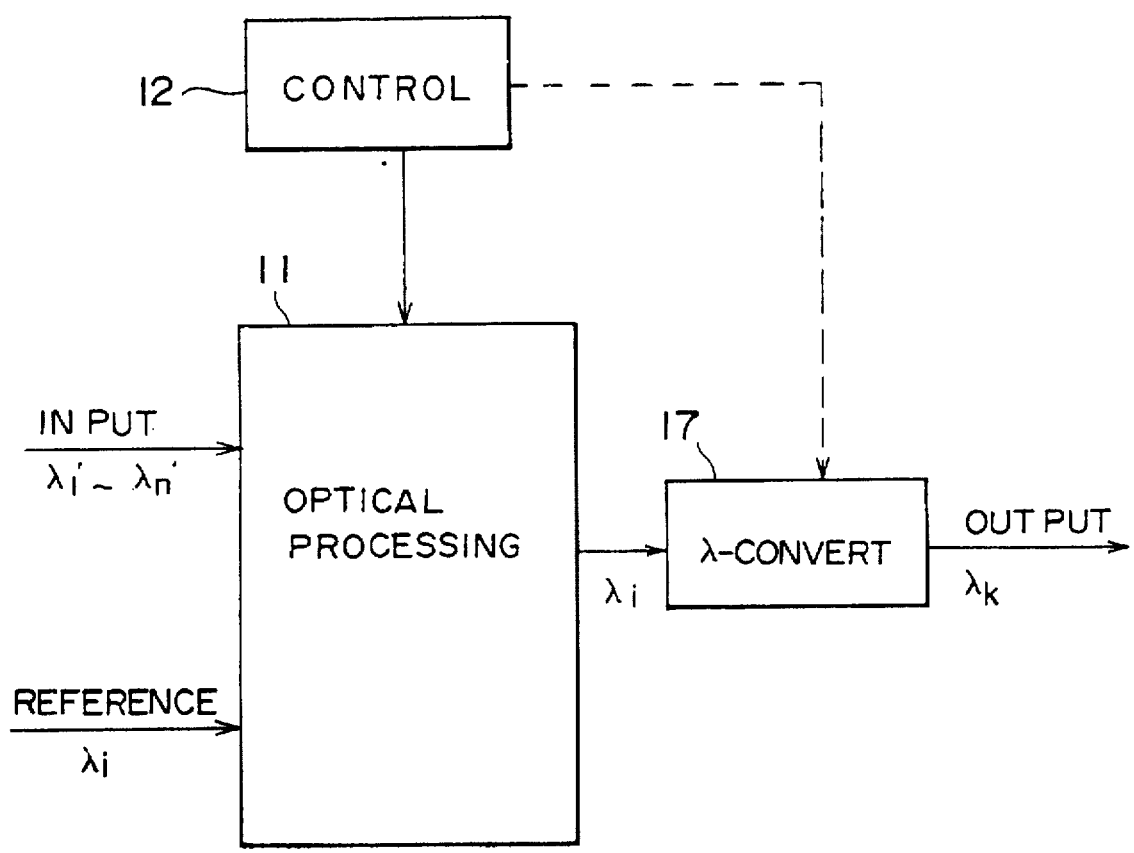
FIG. 11 is a block diagram showing the construction of the wavelength-synchronized optical processing device according to a fourth embodiment of the present invention.

FIG. 11 shows a fourth embodiment of the optical processing device according to the present invention.

Referring to FIG. 11, the optical processing device of the present embodiment has a construction similar to that of FIG. 3 except that there is provided a wavelength converter 17 after the optical processing unit 11 for converting the wavelength of the output optical beam from the wavelength $\lambda_i$ to another wavelength $\lambda_k$. By using the optical processing unit 11a or 11b described with reference to FIGS. 9 and 10 for the wavelength converter 17, one can obtain the output optical beam with the stabilized wavelength $\lambda_k$.

Figure 12:
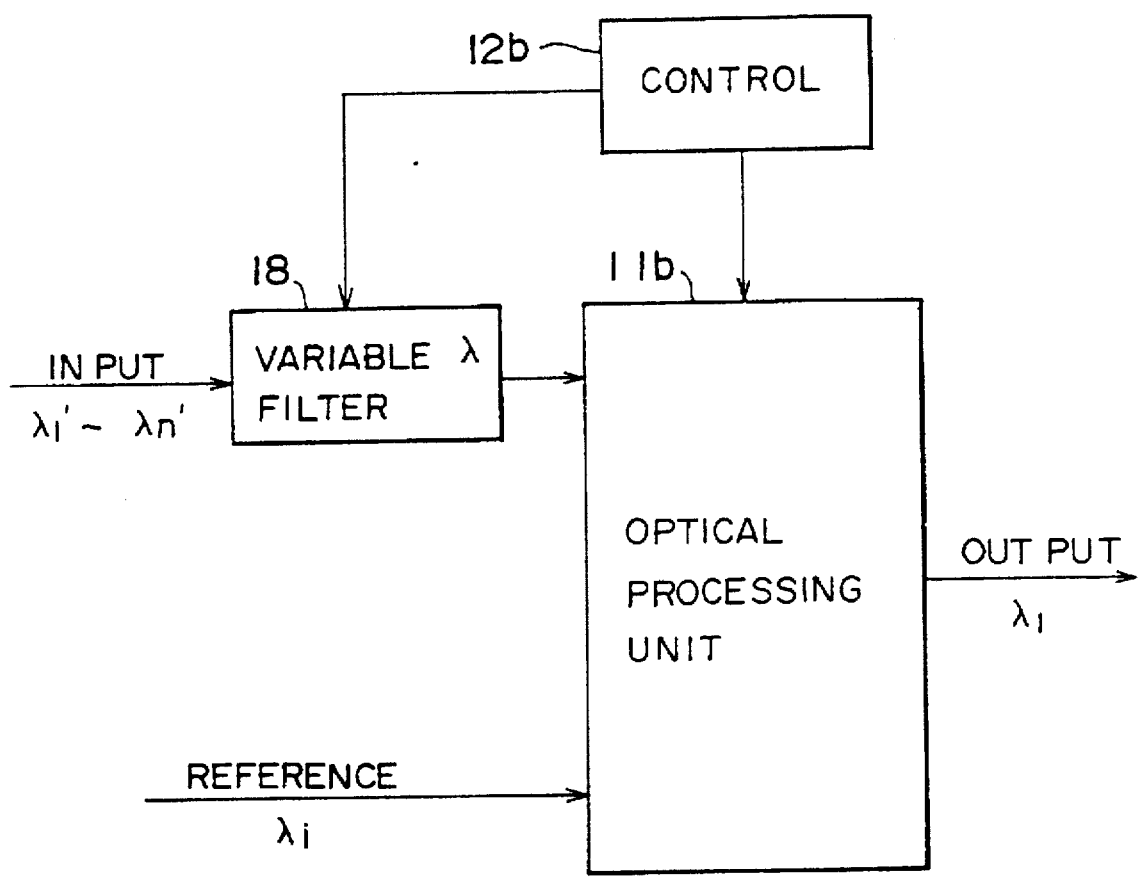
FIG. 12 is a block diagram showing the construction of the wavelength-synchronized optical processing device according to a fifth embodiment of the present invention.

FIG. 12 shows the optical processing device according to a fifth embodiment of the present invention. Referring to the drawing, the optical processing device of the present embodiment has a structure similar to that of FIG. 10 except that there is provided a variable-wavelength filter 18 provided for filtering the input optical beam. As shown in FIG. 12, the variable-wavelength filter 18 is controlled by the controller 12b and selectively passes one of the optical signals multiplexed on the input optical beam with the respective wavelengths $\lambda_1'-\lambda_n'$. In this case, too, any of the desired optical signals that are multiplexed on the input optical beam in the wavelength-multiplex mode is converted to the desired, stabilized wavelength $\lambda_i$.

Figure 13:
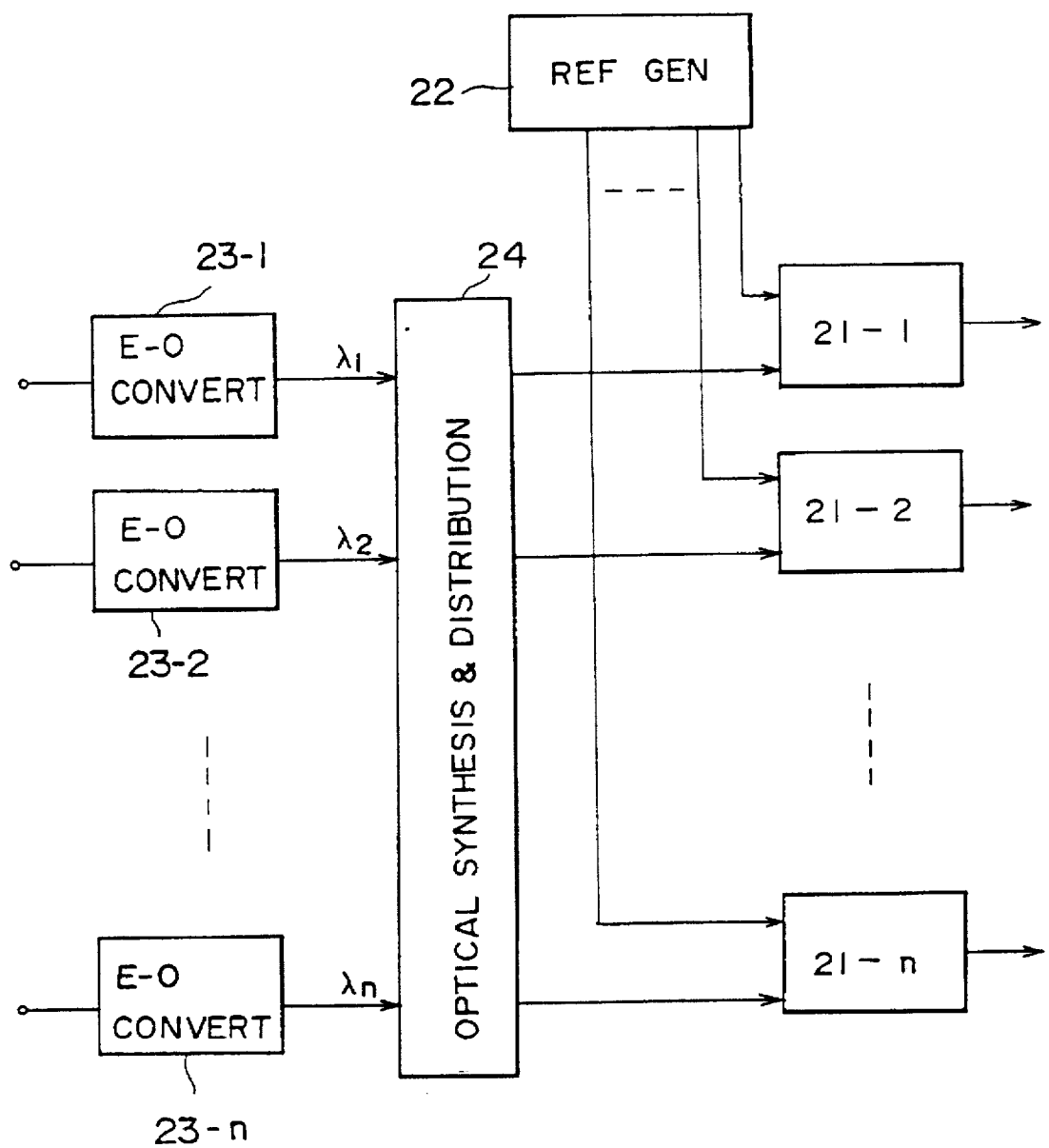
FIG. 13 is a block diagram showing the construction of the optical transmitter according to a sixth embodiment of the present invention that uses the wavelength-synchronized optical processing device.

FIG. 13 shows an optical path selector according to a sixth embodiment of the present invention, wherein a number of optical processing devices $21_1-21_n$ are used.

Referring to the drawing, the optical path selector of the present embodiment uses a number of electro-optic converters $23_1-23_n$, wherein each electro-optic converter may compromise a laser diode that produces an optical signal with a wavelength that is pertinent to the laser diode. Thus, the electro-optic converter $23_1$ produces the optical signal with a wavelength $\lambda_1$, the electro-optic converter $23_2$ produces the optical signal with a wavelength $\lambda_2$, . . . , and the electro-optic converter $23_n$ produces the optical signal with a wavelength $\lambda_n$. Further, the output optical signals of these electro-optic converters are supplied to an optical synthesis and distribution unit 24 that synthesizes a wavelength-multiplexed optical signal from these optical signals.

The output optical signals thus produced by the unit 24 are supplied to respective optical processing devices $21_1-21_n$, wherein each optical processing device $21_1-21_n$ has a construction similar to that of any of the wavelength-synchronized optical processing devices described previously. Further, there is provided a reference optical beam generator 22 that includes a number of stabilized laser diodes, each stabilized in terms of the temperature and bias current, and produces the reference optical beam with stabilized wavelengths.

The reference optical beam thus produced is supplied to the optical processing devices $21_1-21_n$ as the reference optical beam as described previously, and each optical processing device produces an output optical beam with the stabilized wavelength that is specified by the wavelength of the reference optical beam. Thus, when the reference optical beam having the wavelength $\lambda_1$ is supplied to the optical processing device $21_1$, the original optical signal having the wavelength $\lambda_1$ is selectively outputted to the optical transmission line connected to the optical processing device $21_1$ with the stabilized wavelength of $\lambda_1$. Alternatively, the optical processing device $21_1$ may be supplied with the optical output signal of the wavelength $\lambda_2$ from the electro-optic converter $23_2$ and output the same on the transmission line connected to the device $21_1$ with the stabilized wavelength of $\lambda_1$. The selection of the wavelength of the input optical signal at the optical processing devices $21_1$–$21_n$ may be achieved by the control unit provided in each of the optical processing devices.

By multiplexing the output optical signals of the optical processing devices $21_1$–$21_n$ again, one can obtain a wavelength-multiplexed optical signal wherein the wavelength of each signal component is highly stabilized even when there is a fluctuation in the oscillation wavelength of the laser diode used in the electro-optic converters $23_{1-23n}$. Thus, the system of the present embodiment is suited for use in optical path selectors or optical transmitters that send the wavelength-multiplex optical signals with stabilized wavelengths.

Figure 14:
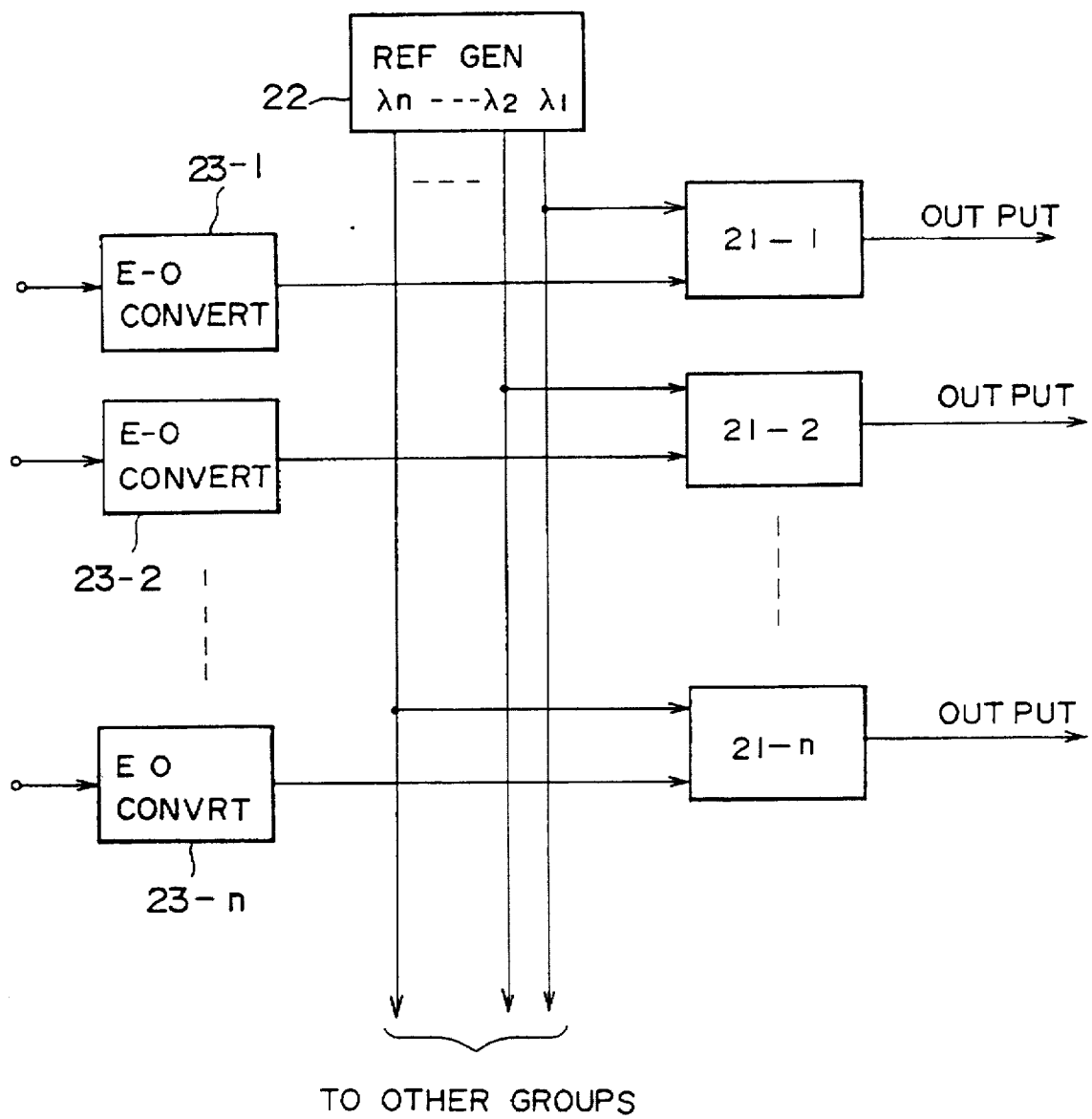
FIG. 14 is a block diagram showing the construction of the optical transmitter according to a seventh embodiment of the present invention that uses the wavelength-synchronized optical processing device.

FIG. 14 shows the block diagram of an optical transmitter according to a seventh embodiment of the present invention.

Referring to FIG. 14, there are provided a number of electro-optic converters wherein the electro-optic converters are grouped into a number of groups each group including a corresponding set of the electro-optic converters $23_1$–$23_n$. In each group, the output optical beams produced by these electro-optic converters are supplied to corresponding optical processing devices $21_{1-21n}$ directly similar to the embodiment of FIG. 13. Further, the reference optical beam generator 22 produces the reference optical beams with the wavelengths of $\lambda_1, \lambda_2, \ldots, \lambda_n$ similar to the embodiment of FIG. 13. Thereby, the wavelengths $\lambda_1$–$\lambda_n$ are different from each other, in each group, and the reference optical beams are supplied to the optical processing devices of other groups in parallel.

In operation, the optical processing devices can produce the optical signals with any desired wavelengths by supplying thereto suitable reference optical beams from the generator 22. For example, one can obtain the output optical signal from the device $21_1$ by supplying the reference optical beam thereto with the wavelength of $\lambda_1$ (i.e., any desired one of $\lambda_1$–$\lambda_n$). Thus, the present embodiment is useful for the optical transmitters and the optical repeaters. Further, the system of FIG. 14 can be configured to form a number of optical channels each carrying the wavelength-multiplexed optical signals of the wavelengths of $\lambda_1$–$\lambda_n$.

Figure 15:
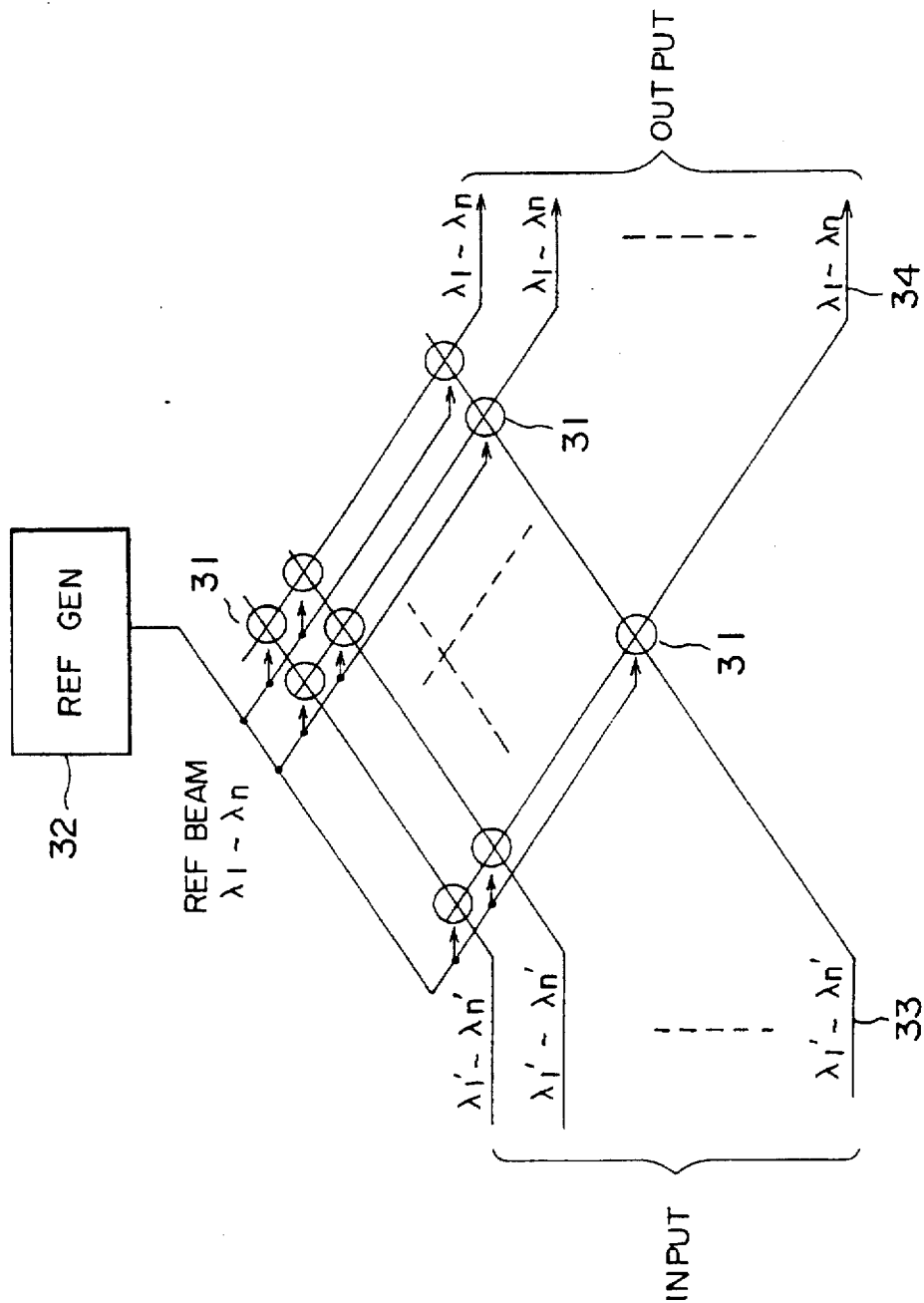
FIG. 15 is a block diagram showing the construction of an optical matrix switch according to an eighth embodiment of the present invention that uses the wavelength-synchronized optical processing device.

FIG. 15 shows an optical matrix switch according to an eighth embodiment of the present invention, wherein there are provided a number of optical transmission lines 33 at the input side and a number of optical transmission lines 34 at the output side. On each transmission line 33 of the input side, respective wavelength-multiplexed optical signals are supplied with wavelengths $\lambda_1'$–$\lambda_n'$, while on each transmission line 34 of the output side, respective wavelength-multiplexed optical signals are produced with wavelengths of $\lambda_1$–$\lambda_n$.

At each intersection of the transmission line 33 and the transmission line 34, there is provided a wavelength-synchronized optical processing device 31 that has a construction of any of the foregoing embodiments of FIGS. 3–12, and each optical processing device 31 is supplied with a corresponding reference optical beam, produced by a reference optical beam generator 32, having a stabilized wavelength selected from the stabilized wavelengths of $\lambda_1$–$\lambda_n$. Thereby, the optical processing device 31 causes a transfer of the input optical signal of the selected wavelength from the transmission line 33 of the input side to the optical transmission line 34 of the output side, wherein the optical signal thus transferred has a stabilized wavelength that is specified by the wavelength of the reference optical beam.

It should be noted that each optical transmission line 34 carries thereon a number of wavelength multiplexed optical signals produced by a group of the optical processing devices 31 that are connected commonly to a single optical transmission line 34. Particularly, the group of the optical processing devices 31 that are provided commonly on one optical transmission line 33 are supplied with a single reference optical beam commonly, and the wavelength of the respective reference optical beam is different in each optical transmission line 33 relative to the other lines 33. Thereby, optical signals of different wavelengths are outputted on each optical transmission line 34 of the output side. Further, by selecting the combination of the wavelengths of the reference optical beams supplied to the devices 33 connected to a given one of the lines 34, one can output any optical signal, which is present on any optical transmission line 33, on any desired optical transmission line 34 with any desired wavelength.

Figure 16:
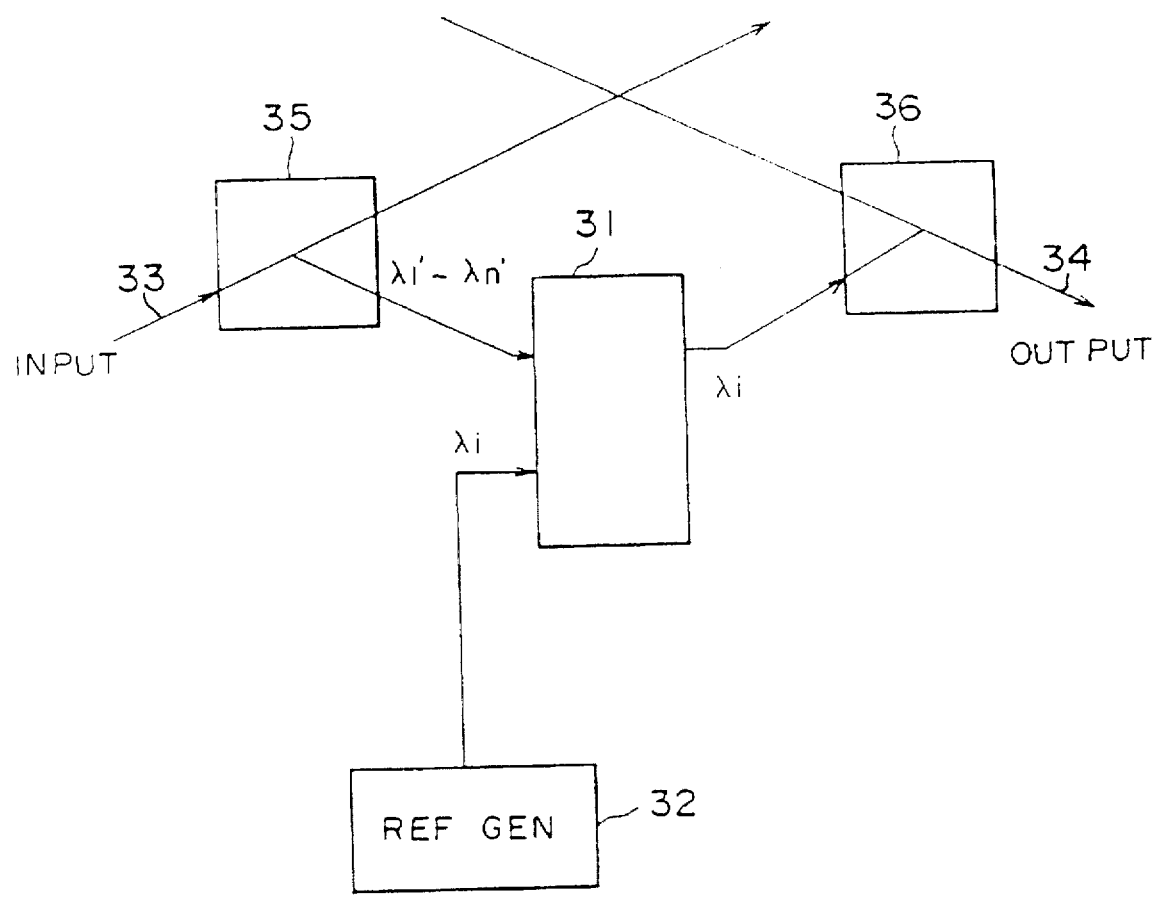
FIG. 16 is a block diagram of an essential part of the optical matrix switch of FIG. 15.

FIG. 16 shows the details of the optical matrix switch of FIG. 15.

Referring to FIG. 16, there is provided an optical divider 35 on the optical transmission line 33 in correspondence to each of the optical processing devices 31, for tapping the wavelength-multiplexed optical signals on the transmission line 33, and the optical signals thus tapped are supplied to the optical processing device 31. The optical processing device 31 selects one of the optical signals on the line 33 base on the reference optical beam of wavelength $\lambda_i$ as supplied thereto from the reference generator 32 and outputs the thus selected optical signal having the wavelength of the reference optical beam. The output optical beam of the optical processing device 31 in turn is supplied to an optical coupler 36 that is provided on the optical transmission line 34 in correspondence to each of the optical processing devices 31. The optical coupler 36 establishes an optical coupling between an optical fiber or waveguide that carries the optical output of the device 31 and the optical fiber or waveguide forming the optical transmission line 34, and the optical beam outputted from the optical processing device 31 is merged or wavelength-multiplexed onto the optical signals on the line 34. It should be noted that such an optical matrix switch can be constructed in the form of optical integrated circuit by forming the optical divider 35 and the optical coupler 36 together with the optical processing device 31 and the reference optical beam generator 32 on a common substrate.

Figure 17:
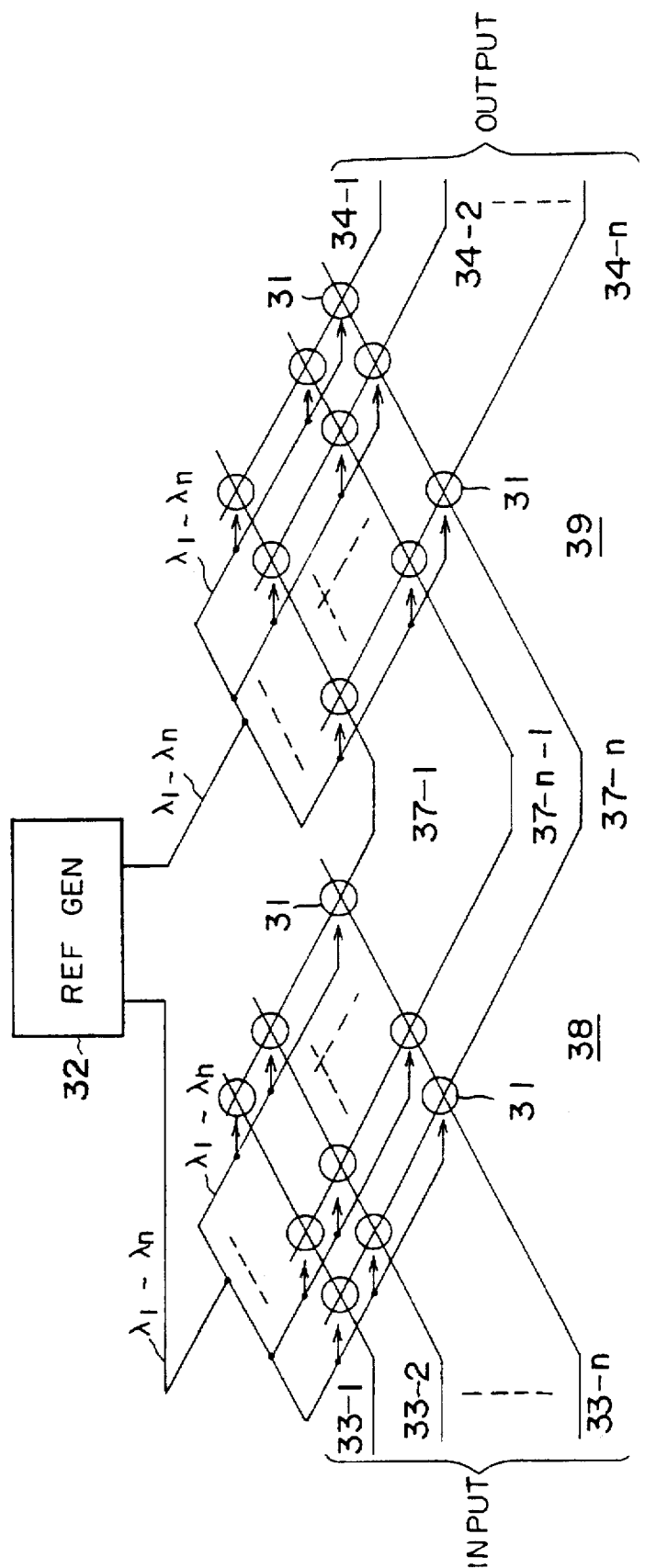
FIG. 17 is a block diagram showing the construction of an optical matrix switch according to a ninth embodiment of the present invention.

FIG. 17 shows an optical matrix switch according to a ninth embodiment of the present invention.

Referring to FIG. 17, two optical matrix switches 38 and 39, each having the construction of FIG. 16 are connected in series, wherein the matrix switches 38 and the matrix switches 39 are connected by intermediate optical transmission lines $37_1$–$37_n$. These optical transmission lines 37-1 to 37-n act as the optical transmission lines at the output side for the optical matrix switch 38 while acting simultaneously as the input side optical transmission lines for the optical matrix switch 39. Further, the reference optical beam generator 32 is used commonly for both the optical matrix switch 38 and the optical matrix switch 39, wherein the reference optical beam generator 32 supplies the reference optical beams to the optical matrix 38 and the optical matrix 39 independently.

As a typical example of operation, the reference optical beam having the wavelength of $\lambda_1$ is supplied to the group of the optical processing devices 31 that are located at the intersections formed between the line $33_1$ and the lines $37_1$–$37_n$, while the reference optical beam having the wavelength of $\lambda_2$ is supplied to the group of the optical processing devices 31 that are located at the intersections formed between the line $33_2$ and the lines $37_1$–$37_n$. Similarly, the (common) wavelength of the reference optical beams supplied to one group of the optical processing devices 31 that are provided on a common optical transmission line of the input side is different from the (common) wavelength of the reference optical beams that are supplied to each other group of the optical processing devices 31 that are provided commonly on each other input side optical transmission line. Thereby, the overlapping of the wavelength of the optical signals that are outputted commonly on an output side optical transmission line, such as the line $37_1$, is positively eliminated.

The optical signals thus outputted on the lines $37_1$–$37_n$ are then switched by the second optical matrix switch 39, wherein optical switching, similar to that described with reference to the optical matrix switch 38, is achieved. Thereby, output optical signals having respective wavelengths determined by the wavelengths of the reference optical beams supplied to the optical matrix switch 39 are obtained at the output optical transmission lines $34_1$–$34_n$. The wavelength of these output optical signals is of course stabilized by using the stabilized optical source for the reference optical beam generator 32.

Figure 18:
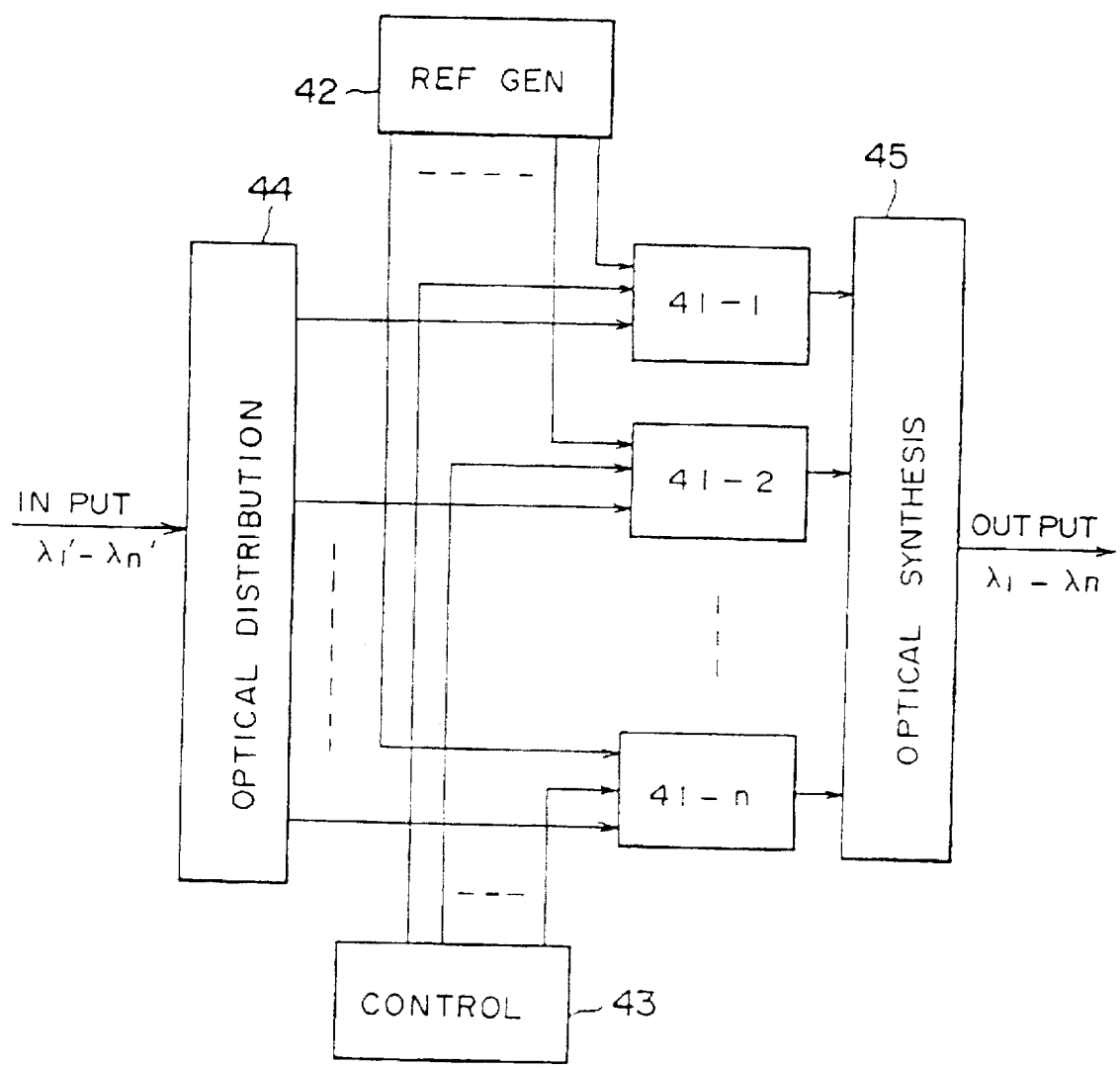
FIG. 18 is a block diagram showing the construction of the optical switching system according to a tenth embodiment of the present invention wherein the wavelength-synchronized optical processing device is used.

FIG. 18 shows a tenth embodiment of the present invention comprising a wavelength converter for converting the wavelength of the optical signals modulated on the input optical beam in the wavelength-multiplexed mode and outputting the optical signals thus converted in the wavelength multiplexed mode.

Referring to FIG. 18, there are provided a number of optical processing devices $41_1$–$41_n$ each having the construction of any of the wavelength-synchronized optical processing devices described previously, wherein each of the optical processing devices $41_1$–$41_n$ is supplied with the wavelength-multiplexed optical signals from the optical distribution part 44, that in turn is supplied with an input optical beam carrying the wavelength-multiplexed signals and distributes the same to the optical processing devices $41_1$–$41_n$. Further, the optical processing devices $41_1$–$41_n$ are controlled by a control unit 43 that selects an optical signal from the wavelength-multiplexed optical signals. When the optical processing unit 11 (e.g., of FIG. 3) is used for the optical processing devices $41_1$–$41_n$, the control unit 43 controls a variable-wavelength filter similar to the filter 13 of FIG. 3. Thereby, the control unit 43 acts as the control unit 12 of FIG. 3.

Further, there is provided a reference optical beam generator 42 that produces the reference optical beam with the wavelengths $\lambda_1, \lambda_2, \ldots, \lambda_n$ and supplies the same to the respective optical processing devices 41-1, 41-2, ... 41-n. In response to the reference optical beams thus supplied, the optical processing devices $41_1$–$41_n$ produce output optical beams in coincidence with respective wavelengths of the reference optical beams supplied thereto. The output optical beams thus produced are added in an optical synthesis unit 45 that produces an output optical beam on which the optical signals are modulated in the wavelength-multiplexed mode.

In the system of the present embodiment, it should be noted that one can convert the optical signal of the wavelength $\lambda_i$ to the optical signal having the stabilized wavelength $\lambda_j$. For example, one can convert the optical signal of the wavelength $\lambda_1$ to the optical signal of the wavelength $\lambda_n$ and the optical signal of the wavelength $\lambda_2$ to the optical signal of the wavelength $\lambda_1$.

Figure 19:
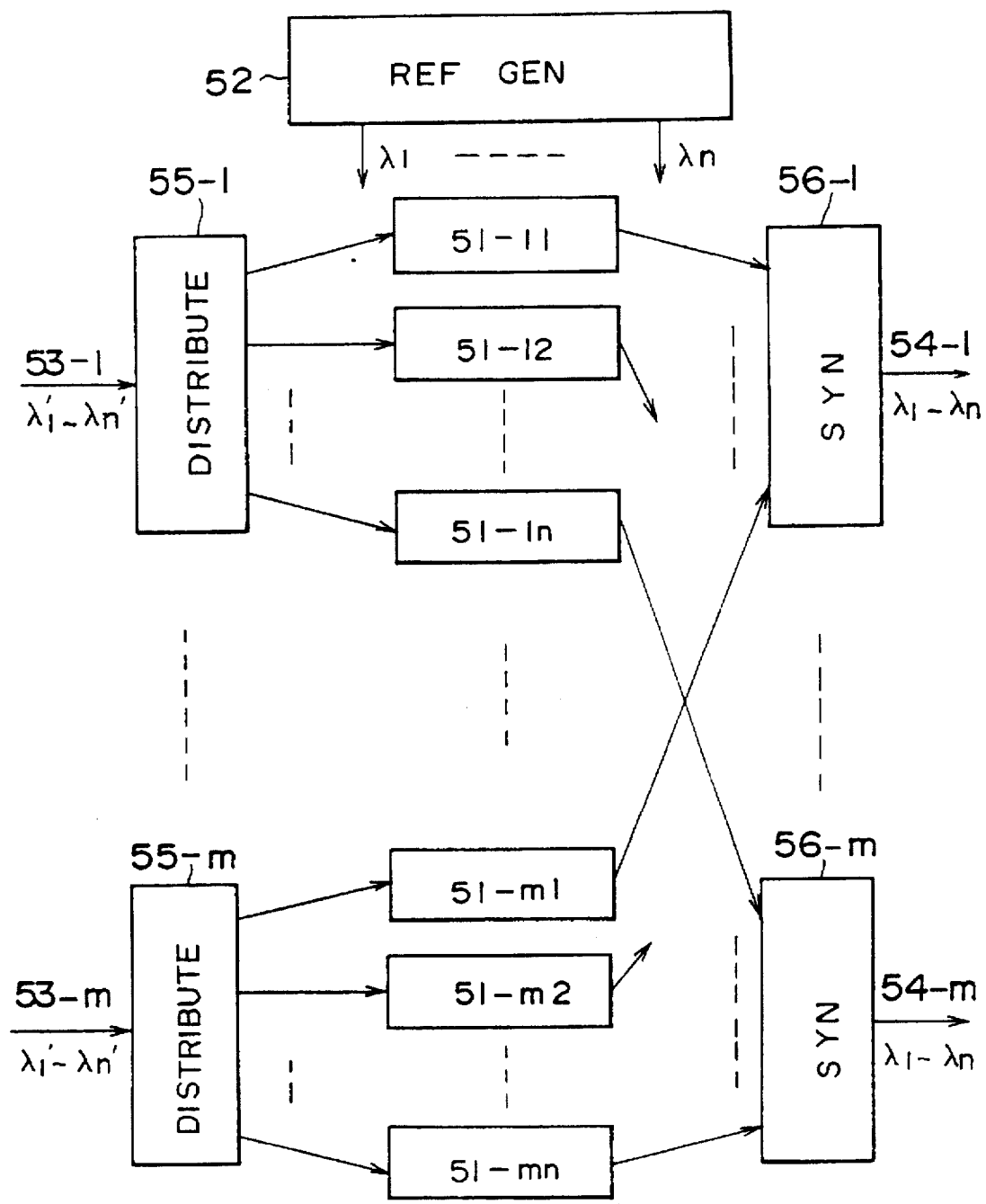
FIG. 19 is a block diagram showing the construction of the optical switching system according to an eleventh embodiment of the present invention.

FIG. 19 shows an eleventh embodiment of the present invention.

Referring to FIG. 19, the optical processing system of the present embodiment includes a number of wavelength-synchronized optical processing devices $51_{11}$–$51_{mn}$, as described previously with reference to FIGS. 3–12, and a reference optical beam generator 52 for producing the reference optical beams.

In the present embodiment, there are a number of optical transmission lines $53_1$–$53_m$ at the input side, wherein each transmission line is connected to a corresponding optical distribution unit $55_1$–$55_m$ and supplies thereto a wavelength-multiplexed input optical beam. Similarly to previous cases, the input optical beam carries thereon the optical signals of the wavelengths $\lambda_1'$–$\lambda_n'$.

Each optical distribution unit such as the unit $55_1$ is connected to a number of optical processing devices such as $51_{11}$–$51_{1n}$ for supplying the wavelength-multiplexed optical signals to each of these devices. The optical processing devices are supplied with the reference optical beams from the reference optical beam generator 52 of respective, selected wavelengths and produce corresponding output optical signals with the respective wavelengths thereof specified by the respective wavelengths of the corresponding reference beams.

More particularly, the reference optical beam of the wavelength $\lambda_1$ is supplied to the optical processing devices $51_{11}$–$51_{1n}$ commonly, the reference optical beam of the wavelength $\lambda_2$ is supplied to the optical processing devices $51_{21}$–$51_{2n}$ (not shown) commonly, . . . and the reference optical beam of the wavelength $\lambda_n$ is supplied to the optical processing devices $51_{m1}$–$51_{mn}$, commonly. Thereby, all the output optical signals produced by the optical processing devices $51_{11}$–$51_{1n}$ have the wavelength $\lambda_1$, all the output optical signals produced from the optical processing devices $51_{21}$–$51_{2n}$ have the wavelength $\lambda_2, \ldots$, and all the output optical signals from the optical processing devices $51_{m1}$–$51_{mn}$ have the wavelength of $\lambda_n$.

In the present embodiment, the optical output of each optical processing device is supplied to a corresponding optical synthesis unit such that each optical synthesis unit is supplied with optical signals of mutually different wavelengths from respective, different optical processing devices. For example, the output optical signal of the optical processing device $51_{11}$ is supplied to an optical synthesis unit $56_1$, the optical output of the optical processing device $51_{12}$ is supplied to an optical synthesis unit $56_2$ (not shown) . . . and the optical output of the optical processing device $51_{1n}$ is supplied to an optical synthesis unit $56_m$. It should be noted that all the optical output signals mentioned above have the wavelength of $\lambda_1$.

When viewed from the side of the optical synthesis unit, the optical synthesis unit $56_1$ is supplied with the output optical signals from the optical processing devices $51_{11}$, $51_{2_1}, \ldots 51_{m_1}$ with the wavelengths of $\lambda_1, \lambda_2, \ldots \lambda_n$ and produces an output optical beam on which these optical signals are multiplexed in the wavelength-multiplexed mode. Similarly, the optical synthesis unit $56_m$ is supplied with the output optical signals from the optical processing devices $51_{1_n}, 51_{2_n}, \ldots 51_{mn}$ with respective wavelengths of $\lambda_1, \lambda_2, \ldots \lambda_n$ and produces an output optical beam on which the optical signals are multiplexes in the wavelength-multiplexed mode. Thereby, the system of FIG. 19 converts the wavelength of the optical signals from $\lambda_1'-\lambda_n'$ to $\lambda_1-\lambda_n$ and simultaneously stabilizes the wavelength of the output optical signals. It should be noted that any combination of the optical signals supplied on the input side optical transmission lines $53_1-53_m$ can be obtained on each of the output side transmission lines $54_1-54_m$ in the form of wavelength-multiplexed optical signals.

Figure 20:
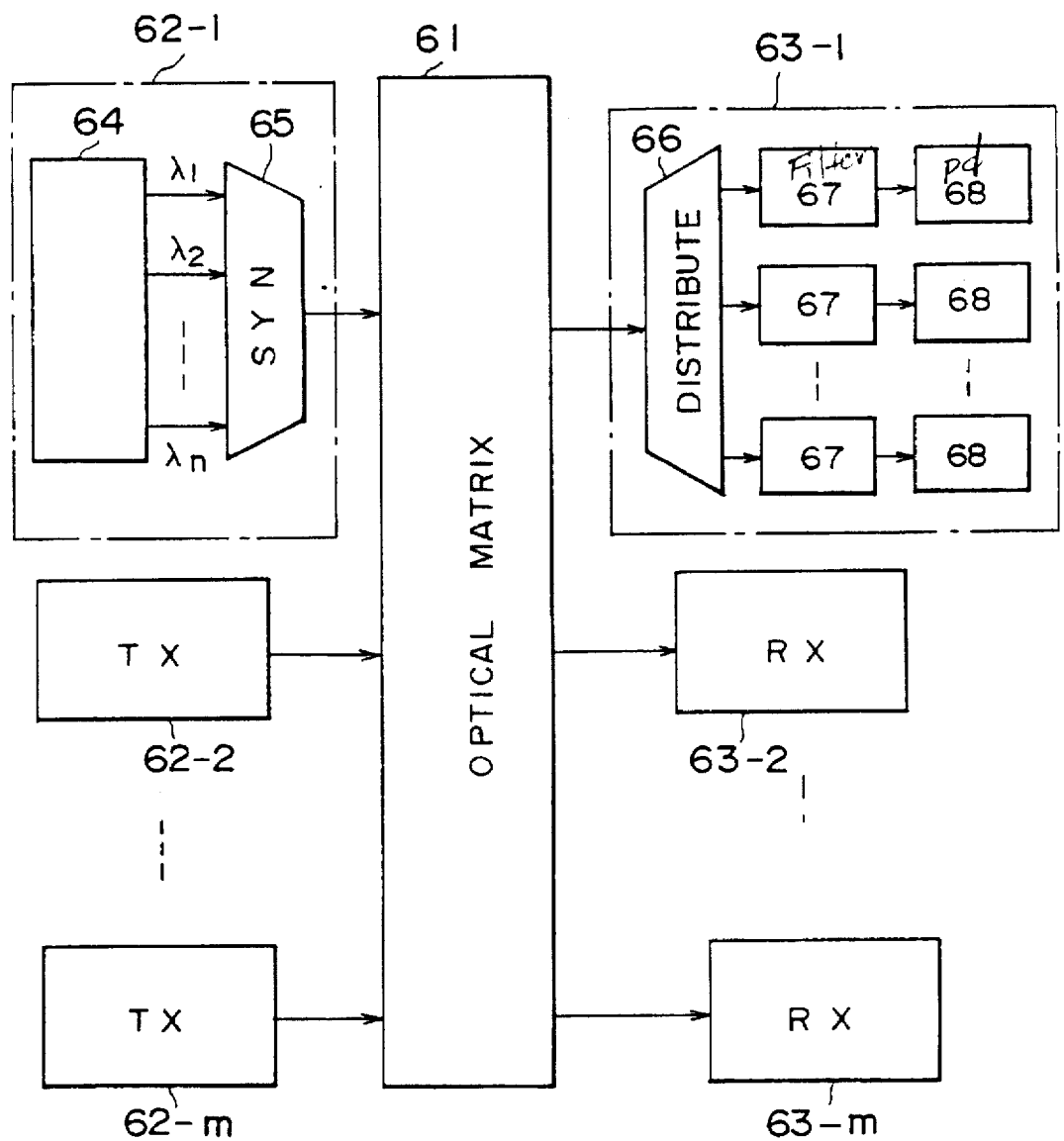
FIG. 20 is a block diagram showing the construction of the optical transmission system according to a twelfth embodiment of the present invention.

FIG. 20 is a block diagram showing the construction of an optical information transmission system wherein an optical matrix switch 61 having the construction of FIG. 15 or FIG. 17 is used.

Referring to FIG. 20, there are provided a number of optical transmission terminals $62_1-62_m$ connected to the input side optical transmission lines of the optical matrix switch 61. Further, a number of optical reception terminals $63_1-63_m$ are connected to the output side optical transmission lines of the matrix switch 61.

Each optical transmission terminal such as the terminal $62_1$ includes an optical transmitter 64 for producing a number of optical signals with respective wavelengths $\lambda_1-\lambda_n$ and an optical synthesizing unit 65 supplied with the optical signals for producing a wavelength-multiplexed optical beam from the optical signals. On the other hand, each optical reception terminal such as the terminal $63_1$ includes an optical distribution unit 66 supplied with the wavelength-multiplexed optical signals from the optical matrix switch 61 and a variable-wavelength filter 67 for selecting an optical signal of a specific wavelength. Further, there is provided a photodetector 68 in connection with the filter 67 for detecting the optical signal that has passed through the filter 67.

By controlling the optical matrix switch 61 in accordance with control information such as the address information, the path and the wavelength of the optical signals are switched in the matrix switch 61. More specifically, one can switch a huge number of channels (number of wavelength multiplex signals X number of transmission lines) simultaneously by using the system of FIG. 20.

FIG. 21 shows a thirteenth embodiment of the present invention.

Referring to FIG. 21, the system of the present embodiment is also an optical transmission system, wherein there are provided a number of transmission terminals $73_1-73_m$ each supplied with electric signals and producing optical signals in correspondence to the electric signals with respective wavelengths.

The output optical signals of the terminals $73_1-73_m$ are supplied to an optical path selector 71 that includes a number of optical synthesis and distribution units 75 and 76 respectively provided in correspondence to the transmission terminals $73_1-73_m$ and the reception terminals $74_1-74_m$. The optical path selector 71 has a construction similar to the system shown in FIG. 19, and the output optical signals of each transmission terminal are mixed to form a wavelength-multiplexed optical signal similar to the embodiment of FIG. 19. Further these wavelength-multiplexed optical signals are selected by the optical processing devices similar to the devices of $51_{11}-51_{mn}$ and are distributed further to a number of optical synthesis and distribution units 76 provided in correspondence to the optical reception terminals $74_1-74_m$. In FIG. 21, the optical processing devices are not illustrated for the sake of clarity of the drawing. There, any combination of the optical signals produced by the optical transmission terminals $73_1-73_m$ is obtained at the output of each optical synthesis and distribution unit 76 in the form of the wavelength-multiplexed optical signals.

The optical output thus obtained is then selectively passes through a filter 77 and is detected by a photodetector 78. In this case, too, one can switch a large number of connections, of which the number is given by the product of the number of wavelength-multiplex signals and the number of optical transmission lines or channels, simultaneously.

Further, the present invention is not limited to the embodiments described heretofore, but various variations and modifications may be made without departing from the scope of the invention.

What is claimed is:

1. An optical filter device for selectively passing an input optical signal component, included in a plurality of input optical signal components having respective, mutually different wavelengths, in response to a control optical signal component selected from one or more control optical signal components having respective, mutually different wavelengths, comprising:

first filtering means comprising one or more filtering elements forming first group filtering elements, said first group filtering elements having respective, mutually different optical passbands corresponding to said wavelengths of said control optical signal components, each of said first filtering elements being supplied with said plurality of control optical signal components and selectively passing a corresponding one of said control optical signal components therethrough;

second filtering means comprising a plurality of filtering elements forming second group filtering elements, said second group filtering elements having respective, mutually different optical passbands, each of said second filtering elements being supplied with said plurality of input optical signal components and selectively passing a respective one of said input optical signal components, of the corresponding optical passband, therethrough and producing a corresponding output optical signal, of the corresponding optical passband; and transmission control means, comprising a plurality of transmission control elements provided in correspondence to said second group filtering elements and to said first group filtering elements, each of said transmission control elements being supplied with, as an input optical signal thereto, the output optical signal component of the respectively corresponding second group filtering element and being supplied with, as a control signal thereto, the control optical signal component output by the corresponding first group filtering element, and selectively passing therethrough and producing as an output thereof said output optical signal component selectively passed through and output by said corresponding second group filtering element in response to said corresponding control optical signal component output by the corresponding second group filtering element; and a common optical path output supplied with the output optical signal component selectively passed through and output by the transmission control element supplied with the control signal.

2. An optical filter device as claimed in claim 1, wherein said optical passbands of said second filtering elements are tuned to said wavelengths of said input optical signal components.

3. An optical filter device as claimed in claim 2, wherein each of said optical transmission control elements comprises:
- a photodiode, supplied with an input optical signal component from a corresponding second group filtering element and producing an electrical signal in response thereto;
- a drive circuit supplied with said electrical signal from said photodiode and producing a drive signal of a laser amplifier; and
- a laser amplifier supplied with an input optical signal component from a corresponding second group filtering element and with said drive signal from said drive circuit, which amplifies said input optical signal component in response to said drive signal.

4. An optical filter device as claimed in claim 11, wherein each of said second filtering elements comprises:
- first optical switching means, supplied with an input optical signal and a reference optical signal, for selectively outputting one of said input optical signal and said reference optical signal as an output optical signal;
- a tunable optical filter device having an optical passband, said tunable optical filter device being supplied with said output optical signal of said first optical switching means and filtering the same according to said optical passband;
- second optical switching means, supplied with an output optical signal from said tunable optical filter device, for selectively outputting the same from one of first and second optical output ports; and
- control means, supplied with an output optical signal from said second output port, for controlling said optical passband of said tunable optical filter device such that said optical passband of said tunable optical filter device is tuned to the wavelength of said reference optical signal.

5. An optical filter device as claimed in claim 4, wherein:
- said second optical switching means selects said second optical output port when said first optical switching means selects said reference optical signal; and
- said second optical switching means selects said first optical output port when said first optical switching means selects said input optical signal.

6. An optical filter device as claimed in claim 4, wherein said tunable optical device comprises a distributed feedback laser diode, biased below the threshold level of laser oscillation.

7. An optical filter device supplied with an input optical signal for passing the same, comprising:
- first optical switching means, supplied with an input optical signal and a reference optical signal, for selectively outputting one of said input optical signal and said reference optical signal as an output optical signal;
- a tunable optical filter device having an optical passband, said tunable optical filter device being supplied with said output optical signal of said first optical switching means thereby to filter the same according to said optical passband;
- second optical switching means, supplied with an output optical signal from said tunable optical filter device, for selectively outputting the same from one of first and second optical output ports; and
- control means, supplied with an output optical signal from said second output port, for controlling said optical passband of said tunable optical filter device such that said optical passband of said tunable optical filter device is tuned to the wavelength of said reference optical signal.

8. An optical filter device as claimed in claim 7, wherein:
- said second optical switching means selects said second optical output port when said first optical switching means selects said reference optical signal; and
- said second optical switching means selects said first optical output port when said first optical switching means selects said input optical signal.

9. An optical filter device as claimed in claim 7, wherein said tunable optical device comprises a distributed feedback laser diode biased below the threshold level of laser oscillation.

* * * * *

UNITED STATES PATENT AND TRADEMARK OFFICE
CERTIFICATE OF CORRECTION

PATENT NO. : 5,715,075
DATED : Feb. 3, 1998
INVENTOR(S) : TANAKA et al.

It is certified that error appears in the above-identified patent and that said Letters Patent is hereby corrected as shown below:

TITLE PAGE:
    [56] References Cited, under "OTHER PUBLICATIONS," third reference, second line, change "JP-A-62-251895" to --JP-A-62-051895--.

Sheet 17 of 18:
    Fig. 20, under "63-1", in the first block labelled "67", delete the handwritten word "Filter" and in the first block labelled "68", delete the handwritten letters "pd".

Col. 2, line 62, delete "with".

Col. 10, line 39, change "base" to --based--.

Col. 14, line 9, after "obtained" delete "is".

Col. 15, line 20 (Claim 4, line 1), change "11" to --1--.

Signed and Sealed this

Fourth Day of August, 1998

Attest:

BRUCE LEHMAN

*Attesting Officer*       *Commissioner of Patents and Trademarks*